(12) United States Patent
Surek et al.

(10) Patent No.: US 9,538,264 B2
(45) Date of Patent: Jan. 3, 2017

(54) ODUFLEX RESIZING SYSTEMS AND METHODS

(71) Applicants: Steven Arvo Surek, Leonardo, NJ (US); Jeffery Thomas Nichols, Marietta, GA (US); Jeffrey Scott Moynihan, Cumming, GA (US); Mohit Chhillar, Pitam Pura (IN); Anurag Prakash, Noida (IN); Alexander Gurd Young, Ottawa (CA)

(72) Inventors: Steven Arvo Surek, Leonardo, NJ (US); Jeffery Thomas Nichols, Marietta, GA (US); Jeffrey Scott Moynihan, Cumming, GA (US); Mohit Chhillar, Pitam Pura (IN); Anurag Prakash, Noida (IN); Alexander Gurd Young, Ottawa (CA)

(73) Assignee: Ciena Corporation, Hanover, MD (US)

( * ) Notice: Subject to any disclaimer, the term of this patent is extended or adjusted under 35 U.S.C. 154(b) by 94 days.

(21) Appl. No.: 14/489,589

(22) Filed: Sep. 18, 2014

(65) Prior Publication Data
US 2016/0044392 A1    Feb. 11, 2016

(51) Int. Cl.
*H04J 3/16*    (2006.01)
*H04Q 11/00*    (2006.01)
(Continued)

(52) U.S. Cl.
CPC ......... *H04Q 11/0003* (2013.01); *H04J 3/1652* (2013.01); *H04L 47/266* (2013.01);
(Continued)

(58) Field of Classification Search
CPC .................................................. H04J 3/1652
See application file for complete search history.

(56) References Cited

U.S. PATENT DOCUMENTS 7,602,814 B2    10/2009 Meagher et al.
8,259,733 B2    9/2012 Conklin et al.
(Continued)

FOREIGN PATENT DOCUMENTS

| CN | 102984605 A | 3/2013 |
|---|---|---|
| WO | 2012/110108 A1 | 8/2012 |
| WO | 2012110108 A1 | 8/2012 |

OTHER PUBLICATIONS

ITU-T G.7044/Y.1347, "Hitless adjustment of ODUflex(GFP)," International Telecommunication Union, Oct. 2011.*

(Continued)

*Primary Examiner* — Nathan Curs
(74) *Attorney, Agent, or Firm* — Clements Bernard PLLC; Christopher L. Bernard; Lawrence A. Baratta, Jr.

(57) ABSTRACT

An Optical channel Data Unit flex (ODUflex) resizing method, node, and network include determining that the ODUflex needs resizing, wherein the ODUflex is configured in the network on a current path between the node and a second node in the network; when the resizing is a decrease, reducing a size of the ODUflex by i) a resize decrease operation using a control plane or ii) a Link Aggregation Group and Make-Before-Break operation; and, when the resizing is an increase, increasing a size of the ODUflex by i) a resize increase operation using a control plane or ii) a Link Aggregation Group and Make-Before-Break operation. The method provides hitless resizing without using ITU Recommendation G.7044/Y.1347 (10/11) and can perform the reducing or the increasing changing bandwidth of the ODUflex by approximately 100 G in less than a second.

11 Claims, 43 Drawing Sheets

(51) Int. Cl.
*H04L 12/825* (2013.01)
*H04L 12/917* (2013.01)
*H04L 12/911* (2013.01)
*H04L 12/26* (2006.01)

(52) U.S. Cl.
CPC ............ *H04L 47/76* (2013.01); *H04L 47/828* (2013.01); *H04Q 11/0066* (2013.01); *H04L 43/0894* (2013.01); *H04Q 2011/0086* (2013.01)

(56) References Cited

U.S. PATENT DOCUMENTS

| | | | |
|---|---|---|---|
| 8,417,111 | B2 | 4/2013 | Moynihan et al. |
| 8,457,159 | B2 | 6/2013 | Meagher et al. |
| 8,666,247 | B2 | 3/2014 | Srinivasan et al. |
| 8,743,915 | B2 | 6/2014 | Shin et al. |
| 2012/0014284 | A1 | 1/2012 | Ranganathan et al. |
| 2012/0170936 | A1* | 7/2012 | Vissers ................ H04J 3/1658 398/58 |
| 2012/0224857 | A1 | 9/2012 | Su et al. |
| 2013/0084066 | A1* | 4/2013 | Cortez ................ H04J 3/1652 398/48 |
| 2013/0101292 | A1* | 4/2013 | Lanzone .............. H04J 3/1652 398/66 |
| 2013/0121700 | A1 | 5/2013 | Dong et al. |
| 2013/0177305 | A1 | 7/2013 | Prakash et al. |
| 2013/0208595 | A1* | 8/2013 | Connolly .............. H04L 47/266 370/235 |
| 2013/0279904 | A1 | 10/2013 | Tang et al. |
| 2014/0016925 | A1* | 1/2014 | Ceccarelli ............. H04J 3/1652 398/5 |
| 2014/0050470 | A1 | 2/2014 | Youn |
| 2014/0079402 | A1 | 3/2014 | Sharma et al. |
| 2014/0086581 | A1 | 3/2014 | Youn |
| 2014/0119733 | A1 | 5/2014 | Shimizu et al. |
| 2014/0126899 | A1 | 5/2014 | Prakash et al. |
| 2014/0178073 | A1 | 6/2014 | Katagiri |
| 2014/0205278 | A1 | 7/2014 | Kakkar et al. |

OTHER PUBLICATIONS

"Interfaces for the optical transport network," International Telecommunication Union, Feb. 2012, pp. 1-238.
"Hitless adjustment of ODUflex(GFP)," International Telecommunication Union, Oct. 2011, pp. 1-44.
Maarteen Vissers, et al., Huawei Technologies Co., Ltd., ODUflex hitless resizing method, International Telecommunication Union, Telecommunication Standard Sector, COM 15-C572-E, vol. 9 11/15, Sep. 2009, pp. 1-20.
Xiao Peng, et al., ZTE Corporation, Consideration on ODUflex resizing, International Telecommunication Union, Telecommunication Standard Sector, COM15-C586-E, vol. 11, 12 14/15, Sep. 2009, pp. 1-3.
Stephen J. Trowbridge et al., Alcatel-Lucent USA, ODUflex hitless resizing beyond 100G, International Telecommunication Union, Telecommunication Standard Sector, COM15-C0277-E, vol. 11/15, Study Period 2013-2016, pp. 1-6.
Nov. 27, 2015, European Search Report issued in European Patent Application EP 15 17 9049.

* cited by examiner

ODUFLEX RESIZING SYSTEMS AND METHODS

CROSS-REFERENCE TO RELATED APPLICATION(S)

The present patent application/patent claims the benefit of priority of Indian Patent Application No. 2257/DEL/2014, filed on 7 Aug. 2014, and entitled "ODUFLEX RESIZING SYSTEMS AND METHODS," the contents of which are incorporated in full by reference herein.

FIELD OF THE DISCLOSURE

The present disclosure relates generally to networking systems and methods. More particularly, the present disclosure relates to Optical channel Data Unit-flex (ODUflex) resizing systems and methods in Optical Transport Network (OTN).

BACKGROUND OF THE DISCLOSURE

Optical Transport Network (OTN) is defined in various ITU Specifications such as, for example, ITU G.709/Y.1331 (December 2009) "Interfaces for the Optical Transport Network (OTN)," the contents of which are herein incorporated by reference. OTN allows network operators to converge networks through seamless transport of the numerous types of legacy protocols while providing the flexibility required to support future client protocols. Standards for Optical Transport Networks (OTN) have been extended to support a flexible rate Optical channel Data Unit (ODU) called ODU-flex (GFP) (Generic Framing Procedure) to support the transport of variable packet rates and ODUflex (CBR) (Constant Bit Rate) to support fixed bit rates, of varying size. ODUflex is not only flexible, but may be resized in a hitless manner, that is, their rate may be increased or decreased in fixed increments while carrying but without affecting service. Optical transport bandwidth used to connect geographically separated packet switching sites currently needs to be provisioned to accommodate the peak demand. This can be inefficient when peak demand far exceeds typical demand. The current state of the art for ODUflex resizing is to implement the standard ODUflex resizing algorithms defined in ITU Recommendation G.7044/Y.1347 (10/11) "Hitless Adjustment of ODUflex (GFP)" (HAO), the contents of which are herein incorporated by reference.

However, an existing ODUflex channel must be resized by utilizing bandwidth over the same Optical channel Transport Unit (OTU) layer links carrying the existing channel, that is, resizing cannot be performed by switching to new OTU links. The procedures for this process specified in G.7044, even with the link restrictions, are complex and require the implementation of special and complex hardware/firmware and software to support the resizing operation. For example, G.7044 requires adjacency state machines and an end-to-end state machine as well as specialized hardware capabilities—a great deal of cost and complexity. In addition, the resizing operation using the standard approach may take as long as approximately 2 seconds to effect a full resizing operation depending on the magnitude of the resize operation. For example, G.7044 has a bandwidth rate change of 512,000 kbit per second. Finally, the existing resizing operation is limited to connections carried on links that have sufficient bandwidth to support the actual resizing. If any single link along the end-to-end path does not have the requisite available bandwidth, the resizing operation fails.

BRIEF SUMMARY OF THE DISCLOSURE

In an exemplary embodiment, an Optical channel Data Unit flex (ODUflex) resizing method, in a node in a network includes determining that the ODUflex needs resizing, wherein the ODUflex is configured in the network on a current path between the node and a second node in the network; when the resizing is a decrease, reducing a size of the ODUflex by i) a resize decrease operation using a control plane or ii) a Link Aggregation Group and Make-Before-Break operation; and when the resizing is an increase, increasing a size of the ODUflex by i) a resize increase operation using a control plane or ii) a Link Aggregation Group and Make-Before-Break operation. The method can provide hitless resizing without using ITU Recommendation G.7044/Y.1347 (10/11). The reducing or the increasing can change the bandwidth of the ODUflex by approximately 100 G in less than a second. The reducing or the increasing, in the Link Aggregation Group and Make-Before-Break operation, can be performed using the control plane. The ODUflex can be determined to need resizing based on an egress idle cell rate or an ingress flow rate.

The increasing can include determining that one or more links for the current path are unable to support the increase, and performing the increase on a new path for the one or more links. The i) resize increase operation using the control plane or the i) resize decrease operation using the control plane each can include suspending transport of incoming packet flows, issuing a path resize trigger, initiating local node resizing operations, performing path resizing, and enabling the incoming packet flows. The local node resizing operations can be performed substantially in parallel by nodes in the network. The ODUflex resizing method can further include suspending the transport of incoming packet flows using flow control mechanisms with Pause frames or switch flow control (Xon/Xoff) toward a packet client. The Link Aggregation Group and Make-Before-Break operation can utilize steps of creating a second ODUflex between the two nodes, wherein the second ODUflex has more or less bandwidth than the ODUflex based on the detecting, configuring the second ODUflex and the ODUflex in a Link Aggregation Group, and switching traffic to the second ODUflex from the ODUflex. The ODUflex can be an ODUflex (Generic Framing Procedure).

In another exemplary embodiment, a node, in a network, includes a plurality of ports configured with switching between one another; and a controller configured to determine that an Optical channel Data Unit flex (ODUflex) needs resizing on a port of the plurality of ports, wherein the ODUflex is configured in the network on a current path between the node and a second node in the network, when the resizing is a decrease, cause a reduction in a size of the ODUflex by i) a resize decrease operation using a control plane or ii) a Link Aggregation Group and Make-Before-Break operation, and, when the resizing is an increase, cause an increase in a size of the ODUflex by i) a resize increase operation using a control plane or ii) a Link Aggregation Group and Make-Before-Break operation. The controller can perform hitless resizing without using ITU Recommendation G.7044/Y.1347 (10/11). The reduction or the increase can change bandwidth of the ODUflex by approximately 100 G in less than a second. The ODUflex can be an ODUflex (Generic Framing Procedure). The controller can be configured to detect the ODUflex needs resizing based on the egress idle cell rate or ingress flow rate. The i) resize increase operation using the control plane or the i) resize decrease operation using the control plane can include suspending transport of incoming packet flows, issuing a path resize trigger, initiating local node resizing operations, performing path resizing, and enabling the incoming packet flows. The controller can be configured to cause suspension of incoming packet flows using flow control mechanisms with Pause frames or switch flow control (Xon/Xoff) toward a packet client. The Link Aggregation Group and Make-Before-Break operation can include creating a second ODUflex between the node and the second node, wherein the second ODUflex has more or less bandwidth than the ODUflex based on the detecting, configuring the second ODUflex and the ODUflex in a Link Aggregation Group, and switching traffic to the second ODUflex from the ODUflex.

In yet another exemplary embodiment, a network includes an originating node; a terminating node communicatively coupled to the originating node, wherein an Optical channel Data Unit flex (ODUflex) is configured between the originating node and the terminating node; at least one intermediate node between the originating node and the terminating node; and wherein at least one the originating node and the terminating node are configured to determine the ODUflex needs resizing on a port of the plurality of ports, when the resizing is a decrease, cause a reduction in a size of the ODUflex by i) a resize decrease operation using a control plane or ii) a Link Aggregation Group and Make-Before-Break operation, and when the resizing is an increase, cause an increase a size of the ODUflex by i) a resize increase operation using a control plane or ii) a Link Aggregation Group and Make-Before-Break operation.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
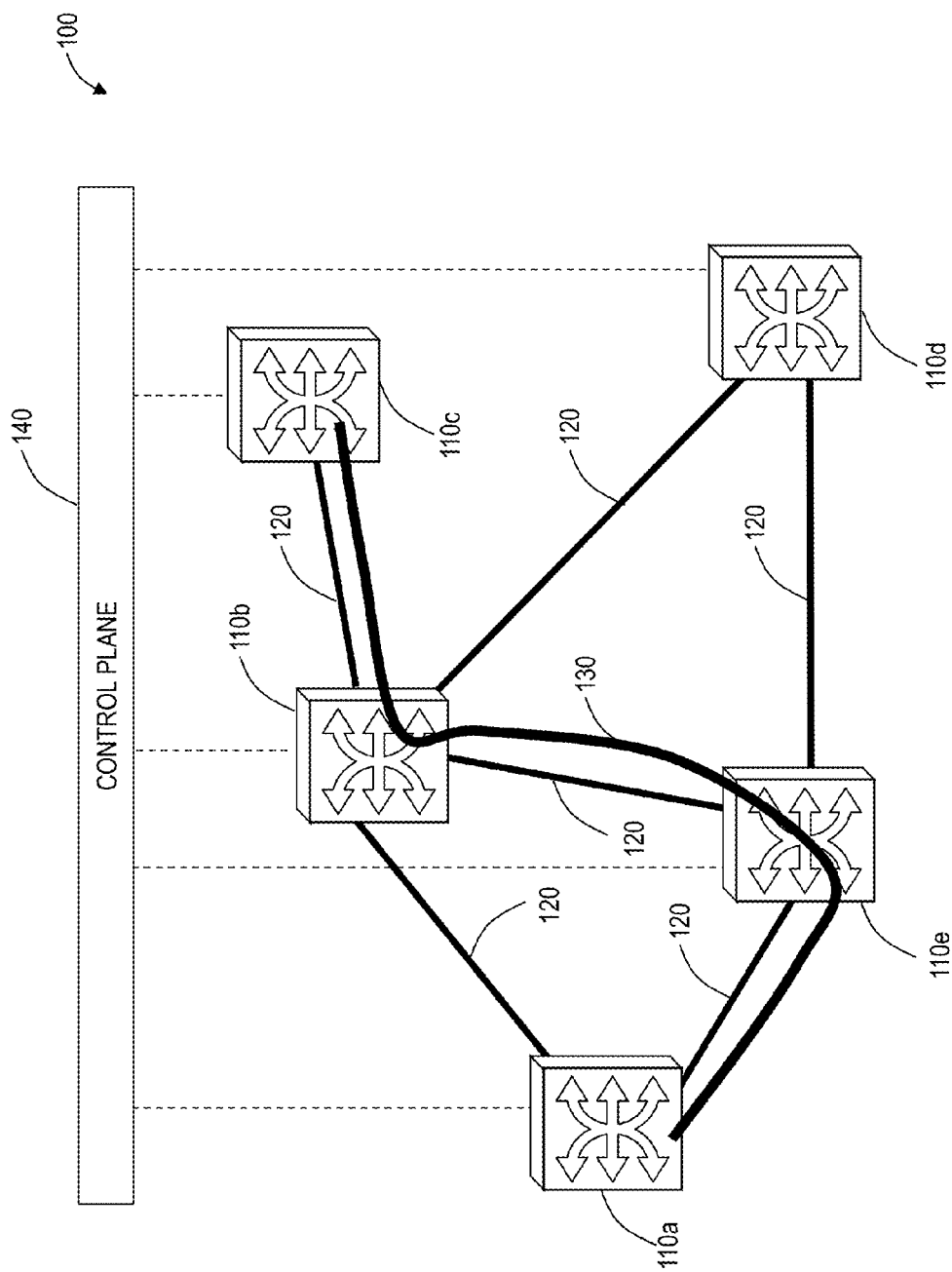
FIG. 1 is a network diagram of an exemplary OTN network with five interconnected nodes.

In various exemplary embodiments, ODUflex resizing systems and methods are described. The ODUflex resizing systems and methods provide a hitless or near hitless resizing process of the bandwidth of an ODUflex that may be triggered using available control plane technology and standard monitoring functions already supported for OTN networks without requiring the development of any of the special hardware/firmware and software required to implement the standard resizing process in G.7044. In addition, the ODUflex resizing systems and methods allow a connection to be resized onto OTU links other than those carrying the existing ODUflex channel. Further, the ODUflex resizing systems and methods allow bandwidth to be dynamically and hitlessly adjusted with faster adjustment rate than the existing G.7044 techniques (e.g., change bandwidth by ~100 G in less than a second). The result is lower optical transport bandwidth consumption for the same service delivery.

There are several benefits of this approach. First, the ODUflex resizing systems and methods use existing functionality and do not require development of any of the special purpose hardware/firmware and software required by the current ODUflex resizing standard, and if sufficient packet buffering is provided at ingress, resizing may be performed in a hitless manner. That is, this solution, by using control plane routing capabilities, allows ODUflex (GFP) resizing to be performed on the existing ODUflex path or a modified ODUflex path (switching to new links that have sufficient bandwidth to support the resizing operation) without requiring complex hardware/firmware and supporting software development required to implement the standards based procedure specified in ITU Recommendation G.7044.

Second, since the resizing operation operates in parallel on all nodes along the resized path it operates very quickly and nearly independently of the magnitude of the resize operation (the standard resizing approach increases bandwidth gradually over a time period dependent on the magnitude of the resize operation). The solution supports the suspension of packet transport functions, along with the required packet buffering and/or flow control mechanism, during resizing to avoid traffic disruption. Finally, this solution utilizes control plane to configure each node to perform the resizing operation and trigger the start of the resizing process. This eliminates the need to perform any manual operations at each node along the ODUflex path. This solution allows the use of a fast hardware-based resizing trigger mechanism and the execution of parallel resizing operations on each node to speed the overall resizing operation and reduce the time required for packet transport suspension.

Additionally, the ODUflex resizing systems and methods can combine link aggregation groups from packet technology with Make Before Break (MBB) technology from OTN control plane technology to create a simpler hitless resizing solution. This can allow network operators to use less transport bandwidth for the same services, increasing the value of existing network transport bandwidth. Rapid changes in bandwidth are possible because they are limited only by the control plane connection rate and not subject to the GFP rate ramping found in other techniques such as in G.7044, i.e. where a bandwidth rate change is limited to 512,000 kbit per second. Faster and simpler demand metrics are possible by using the GFP idle rate, and the ODUflex resizing systems and methods leverage existing control plane MBB Subnetwork Connection (SNC) functionality and Packet-Optical Transport Systems (POTS) Virtual Local Area Network (VLAN) switching technology rather than requiring development of new protocols (both hardware and software).

Exemplary OTN Network

Figure 43:
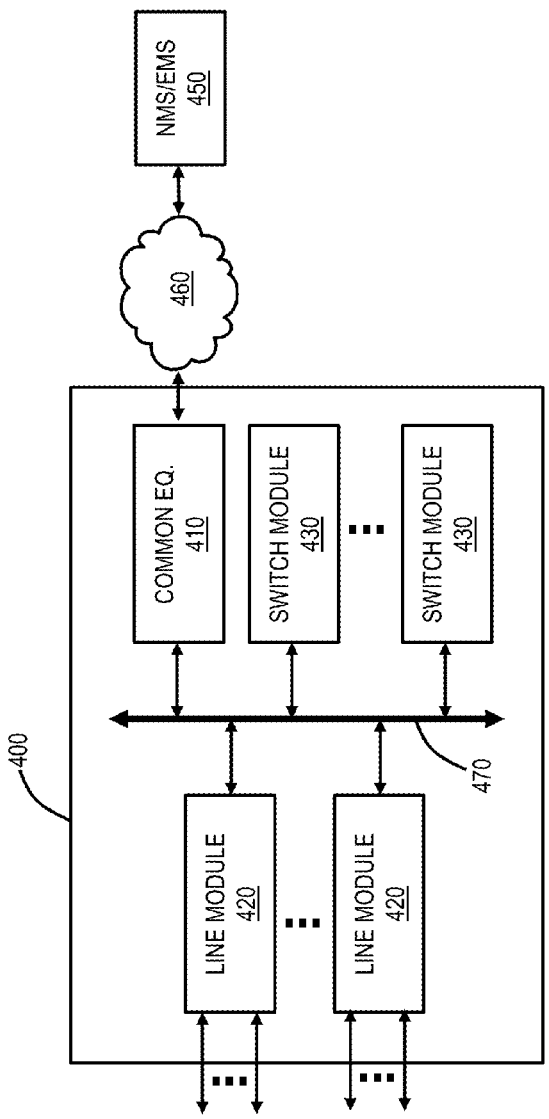
FIG. 43 is a block diagram of an exemplary node for use with the systems and methods described herein.

Referring to FIG. 1, in an exemplary embodiment, a network diagram illustrates an exemplary OTN network 100 with five interconnected nodes 110a, 110b, 110c, 110d, 110e. The nodes 110 are interconnected through a plurality of links 120. The nodes 110 communicate with one another over the links 120 through OTN. The nodes 110 can be network elements which include a plurality of ingress and egress ports forming the links 120. An exemplary node 110A is illustrated in FIG. 43. The network 100 includes a connection 130 with ingress/egress at the nodes 110a, 110c and intermediate nodes 110b, 110e. The connection 130 can be a sub-network connection (SNC) or a label switched path which is an ODUflex such as an ODUflex (GFP). The connection 130 is an end-to-end path or an end-to-end signaled path and from the view of the client signal contained therein, it is seen as a single network segment. These rates can be based on standard rates, such as 1 Gigabit Ethernet, 10 Gigabit Ethernet, 40 Gigabit Ethernet, 100 Gigabit Ethernet, etc., or on sub-rates, such as a 100 Gigabit Ethernet Physical Layer running at 50 GB/s. The nodes 110 can also be referred to interchangeably as network elements (NEs). The OTN network 100 is illustrated, for example, as an interconnected mesh network, and those of ordinary skill in the art will recognize the OTN network 100 can include other architectures, with additional nodes 110 or with less nodes 110, etc.

Optical (i.e., transport) networks and the like (e.g., Wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween.

In OTN control plane networks, a sub-network connection (SNC) for ASON and OSRP or Optical channel Data Unit (ODU) label switched path (LSP) for GMPLS are established at specific rates depending on either the standard Optical channel Data Unit level k (ODUk) rates, where k=0, 1, 2, 2e, 3, 3e2, 4, etc.) or the client rate in the case of ODUflex. Note, SNCs and ODU LSPs (or simply LSPs) can both be referred to as end-to-end paths or end-to-end signaled paths. For packet clients mapped to OTN, the client determines the OTN rate. These rates can be based on standard rates, such as 1 Gigabit Ethernet (GbE), 10 GbE, 40 GbE, 100 GbE, etc., or on sub-rates, such as a 100 Gb Physical Layer running at 50 GB/s. In either case, the ODU container must be established at a rate high enough to transport the incoming packets.

The OTN network 100 can include a control plane 140 operating on and/or between the nodes 110a, 110b, 110c, 110d, 110e. The control plane 140 includes software, processes, algorithms, etc. that control configurable features of the OTN network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, or the like. Those of ordinary skill in the art will recognize the OTN network 100 and the control plane 140 can utilize any type of control plane for controlling the nodes 110 and establishing connections therebetween. The OTN network 100 can be referred to as a Layer 1 (L1) control plane network, which may implement the ODUflex resizing systems and methods described herein.

In the terminology of ASON and OSRP, sub-network connections (SNC) are end-to-end signaled paths since from the point of view of a client signal, each is a single network segment. In GMPLS, the SNCs are an end-to-end path referred to as an Optical channel Data Unit (ODU) label switched path (LSP). For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In the various descriptions herein, reference is made to SNCs for illustration only of an exemplary embodiment of the ODUflex resizing systems and methods. Those of ordinary skill in the art will recognize that SNCs and ODU LSPs (or simply LSPs) can both be used with the systems and methods described herein for end-to-end paths. That is, for GMPLS-based systems, the connection 130 would be referred to as an LSP or an ODU LSP. The term end-to-end path as used herein may refer to an SNC, an LSP, etc. and an optical control plane may include ASON, OSRP, GMPLS, etc.

ODUflex Resizing Systems and Methods

The ODUflex resizing systems and methods include two techniques that are used to hitlessly or near hitlessly resize an ODUflex (GFP) such as the connection 130 without the aforementioned limitations of G.7044 HAO. A first technique can be referred to as a resizing technique via the control plane 140 and a second technique can be referred to as a new connection technique using LAG+MBB. Both of the techniques can be used to resize the connection 130 hitlessly or near hitlessly without using G.7044 HAO and without the limitations associated therewith.

The resizing technique utilizes the control plane 140 to control resizing operations—initiation and execution of a resizing operation. The resizing technique can reconfigure the original connection if a resizing failure occurs. The resizing technique supports resizing along the initial path or, if sufficient bandwidth is not available, resizing to a new path or new path segment using make before break (MBB) operation to minimize traffic disruption. Also, the resizing technique can temporarily suspend packet transport while resizing operation is performed by utilizing flow control when possible to suspend an incoming packet flow. If flow control to buffer incoming packets during the resizing operation is not possible, the resizing technique can transmit GFP Idle frames during the resizing operation. The resizing technique provides fast signaling of resizing triggers to minimize packet transport suspension interval during resizing. The resizing technique can signal resizing using a control plane message (if fast enough) or via OTN overhead monitored along the path where resizing occurs, and can execute resizing operations in parallel at downstream nodes to speed resizing operation. The resizing technique can support resizing for connections that initiate or terminate on either side (line or drop side) of the originating or terminating node switch fabrics. The new connection technique creates a new path for the connection 130 and configures the connection 130 in a LAG with a connection on the new path. Once the LAG is established, the connection 130 can be switched to the new path, such as using MBB and Subnetwork Connection Protection (SNCP) for hitless switching without pausing the flow.

ODUflex Resizing Method

Figure 2:
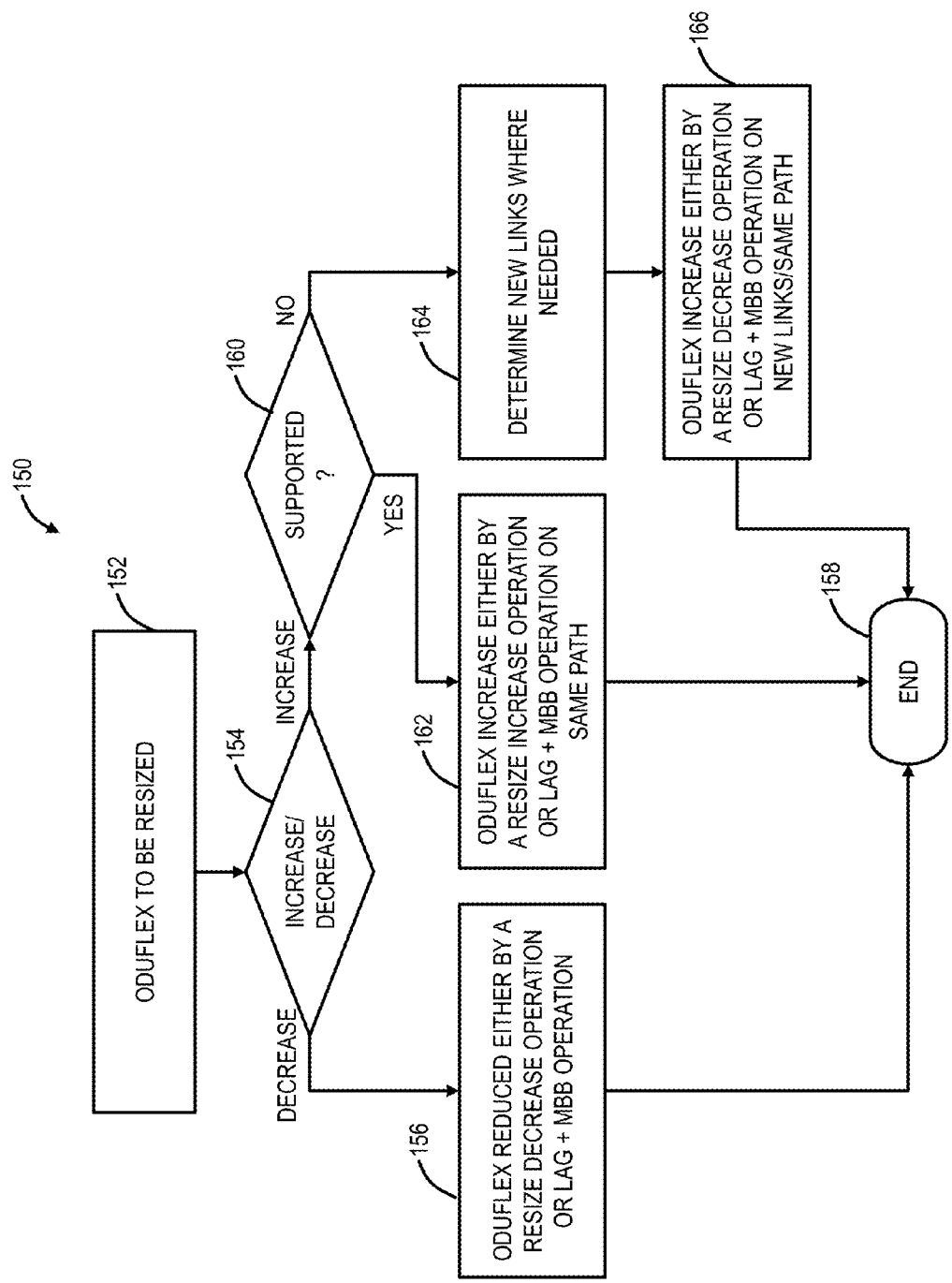
FIG. 2 is a flowchart of an ODUflex resizing method.

Referring to FIG. 2, in an exemplary embodiment, a flow chart illustrates an ODUflex resizing method 150. The ODUflex resizing method 150 contemplates operation in a network such as the network 100 on the connection 130. The ODUflex resizing method 150 detects that an ODUflex needs to be resized (step 152). For example, this can be done via detect GFP idle frames. Again, there are two techniques—Resizing with control plane and flow control/GFP Idle and a new connection with LAG. The ODUflex resizing method 150 determines whether bandwidth of the ODUflex needs to be increased (for example, more Timeslots (TSs)) or decreased (for example, less TSs) (step 154). If the ODUflex needs to be decreased (step 154), the ODUflex is reduced either by a resize decrease operation or LAG+MBB operation, as described herein (step 156), and the ODUflex resizing method 150 ends (step 158).

If the ODUflex needs to be increased (step 154), the ODUflex resizing method 150 checks if the current path supports more bandwidth (step 160). For the resize increase operation, the current path only needs to additionally support the TSs to be added. For the LAG+MBB operation, the current path needs to additionally support the current ODUflex TSs times 2 plus all of the new TSs—this is because the LAG+MBB operation adds a second ODUflex which is new and resized as needed. If the current path supports the increase (step 160), the ODUflex is increased either by a resize increase operation or LAG+MBB operation on the same path (step 162), and the ODUflex resizing method 150 ends (step 162).

If the current path does not support the increase (step 160), for example, because not all of the links can support the increase, the ODUflex resizing method 150 determines where new links are needed (step 164). Note, the ODUflex resizing method 150 can use just a couple of new links or a completely new path. Finally, the ODUflex resizing method 150 includes increasing the ODUflex either by a resize increase operation or LAG+MBB operation on the new links/same path (step 166).

Resizing with Control Plane and Flow Control/GFP Idle

Again, the resizing technique uses control plane messaging to signal to all nodes along an ODUflex path that a resizing operation is to be performed and the nature of that operation, i.e., whether the operation is a rate increase or decrease and the magnitude of the rate change. The process follows in three steps:

1) Issue a control plane message to partially configure or reserve the new path (resized path). This step may involve rerouting of a portion or even the entire end-to-end path.

2) Suspend packet transfer across the existing ODUflex connection just prior to the execution of the physical resizing operation, when there is buffering available. This step allows the follow-on resizing operation to be performed without affecting any traffic in transit.

3) Issue a signal to trigger the actual end-to-end connection resizing using the configured/reserved path. The resizing trigger may be another control plane message or a hardware-based in-band signal carried along the existing end-to-end ODUflex channel being resized. If the resizing trigger function utilizes a hardware-based in-band signal, the control plane message in step 1) above configures monitoring functions along the existing end-to-end ODUflex channel for the purpose of detecting the resizing trigger.

The use of hardware-based signaling to trigger resizing may provide for faster detection and execution of the actual resizing operation. Note that regardless of the trigger mechanism, the actual resizing trigger propagates to all nodes along the existing path and is not delayed by waiting for the resizing operation to complete in one node before continuing on to the next node. This allows each node to execute its resizing operation independently of other nodes, that is, the individual node resizing operations occur in parallel, thereby speeding up the overall resizing process. The overall resizing operation includes resizing of the client to ODUflex mapping/demapping functions at the originating and terminating nodes, resizing or reconfiguration of the ODUflex channel carried over each OTU link traversed end-to-end, and the resizing or reconfiguration of any associated cross-connections required to support the end-to-end ODUflex channel.

For an increase, step 1) above allows for control plane routing of the resized connection over new OTU links that may be different from the initial path. Any number of links may be rerouted, from none (follow the existing path) to all (follow an entirely new path). This allows resizing that is not restricted to the existing set of OTU links used by the initial ODUflex channel, where one or more of those links may have insufficient bandwidth to support the resizing operation. The resizing operation either merges the existing path with the additional bandwidth configured/reserved during the step 1) for OTU links that have sufficient bandwidth to support the resizing, or switches the connection to a new path segment using new OTU links also configured during step 1).

To minimize and possibly eliminate traffic disruption during the resize operation, immediately prior to the issuance of the resizing trigger (either a control plane message or a hardware-based trigger), packet forwarding is suspended and incoming packets are buffered during the resizing operation. The suspension of packet forwarding may be supported through the use of flow control mechanisms such as Pause frames or switch flow control (Xon/Xoff) toward the packet client. Once the packet flow has been suspended, GFP idle frames are inserted into the existing path, the resizing trigger is sent and resizing is executed. Since all nodes are performing the resizing operations in parallel, packet transport at the source node may be resumed once the worst case node (slowest node) has completed its reconfiguration process. As long as there is sufficient buffering to accommodate storage of incoming packets during the time packet transport is suspended, the resizing operation can be performed without any loss of service data (hitless resizing).

For a size decrease, a similar procedure is used, but with the following differences: the signal message of step 1) identifies the bandwidth to be removed from each link of the end-to-end connection, that bandwidth is always removed from the existing path (there is no need to reconfigure the connection to new OTU links), and each resizing operation involves splitting the bandwidth being removed from the initial ODUflex connection.

Figure 3:
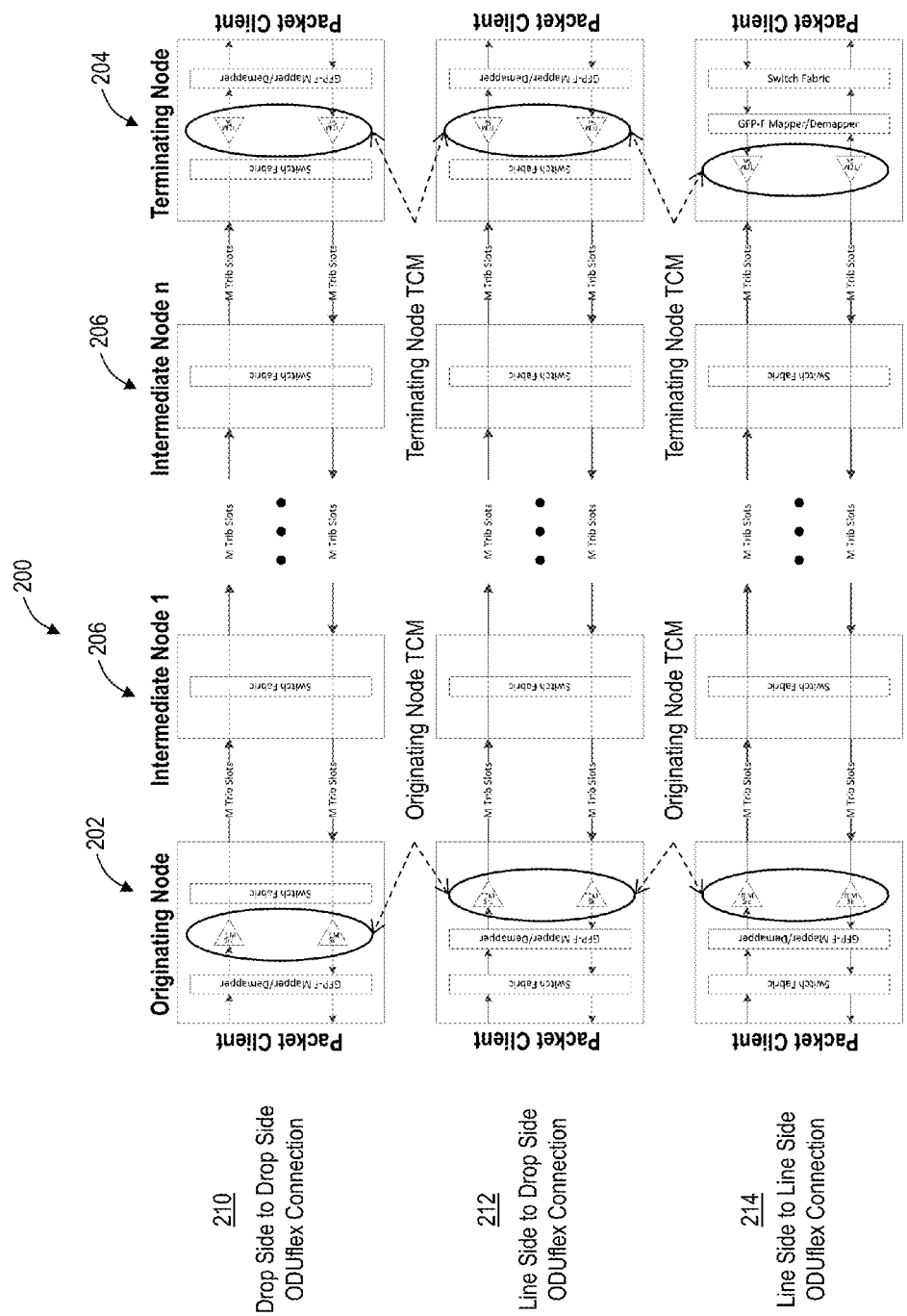
FIG. 3 is a network diagram of an Initial M-Tributary Slot ODUflex (GFP) Circuit Before Resizing.

Referring to FIGS. 3-33, in various exemplary embodiments, network diagrams and flowcharts illustrate various aspects of the resizing with the control plane 140 and flow control/GFP Idle. In the network diagrams, a network 200 is illustrated with an originating node 202, a terminating node 204, and n intermediate nodes 206 (n being ≥1). Additionally, the network 200 includes three scenarios 210, 212, 214. The scenario 210 includes a Drop Side to Drop Side ODUflex Connection, the scenario 212 includes a Line Side to Drop Side ODUflex Connection, and the scenario 214 includes a Line Side to Line Side ODUflex Connection. FIG. 3 illustrates an Initial M-Tributary Slot ODUflex (GFP) Circuit before Resizing. Here, there is End-to-end service monitoring through Tandem Connection Monitoring (TCM). Originating and Terminating Node TCM source and sink functions: may be used to trigger resizing operation, and if so could be configured prior to or as part of the resizing operation and they may be set up manually or via the control plane 140.

Resizing Increase Operation

Figure 4:
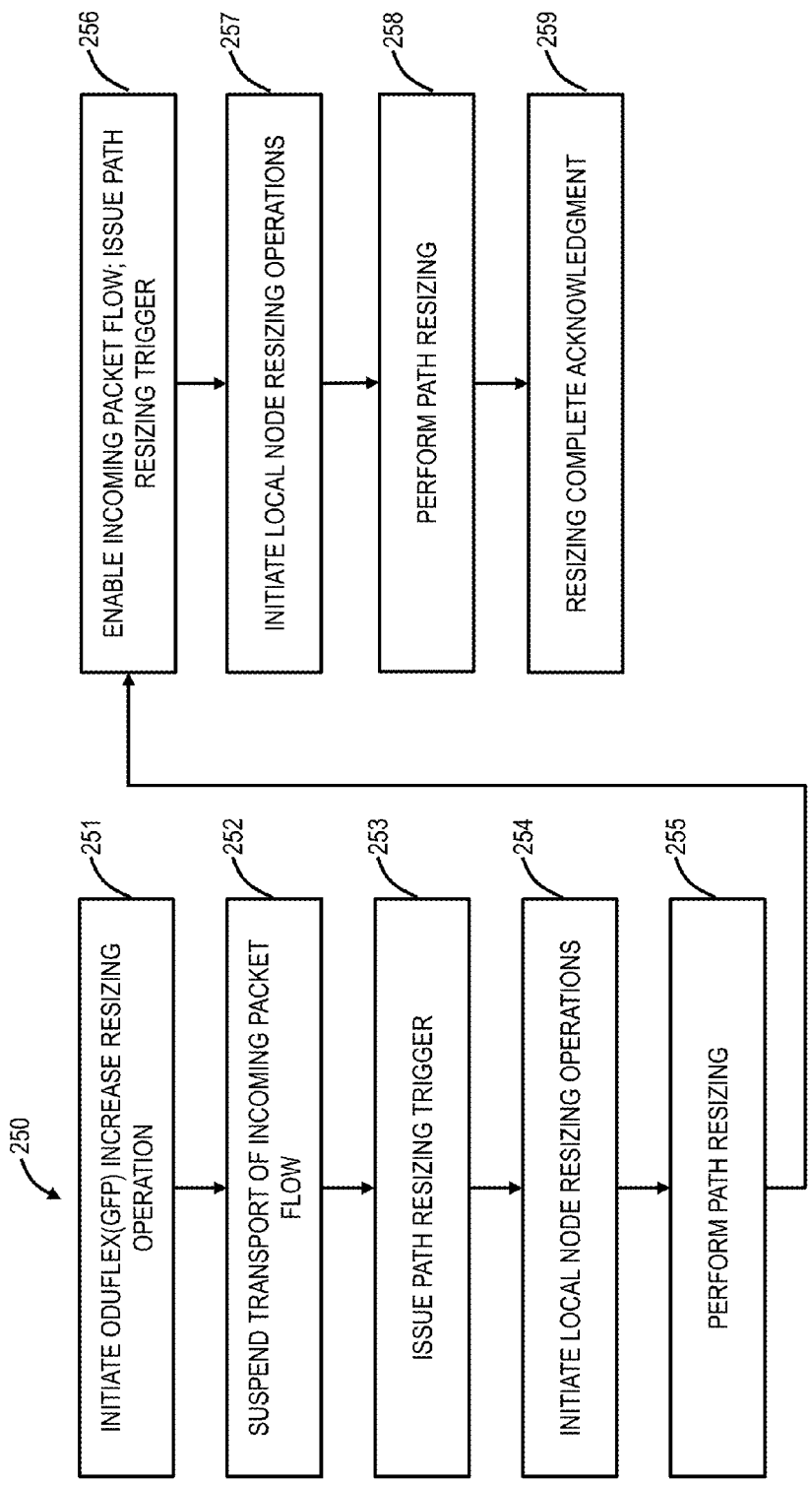
FIG. 4 is a flowchart of an example of a resizing increase operation using the control plane and OTN overhead Tandem Connection Monitoring (TCMs) to signal the resizing operation.

FIG. 4 is a flowchart of an example of a resizing increase operation 250 using the control plane and OTN overhead (TCMs) to signal the resizing operation, and FIGS. 5-18 are network diagrams of the network 200 illustrating various steps in the resizing increase operation 250. The resizing increase operation 250 includes initiating ODUflex (GFP) increase resizing operation (step 251), suspending transport of incoming packet flow (step 252), issuing path resizing trigger (step 253), initiating local node resizing operations (step 254), performing path resizing (step 255), enabling incoming packet flow; issuing path resizing trigger (in opposite direction) (step 256), initial local node resizing operations (step 257), perform path resizing (step 258), and initiating resizing complete acknowledgment (step 259).

Figure 5:
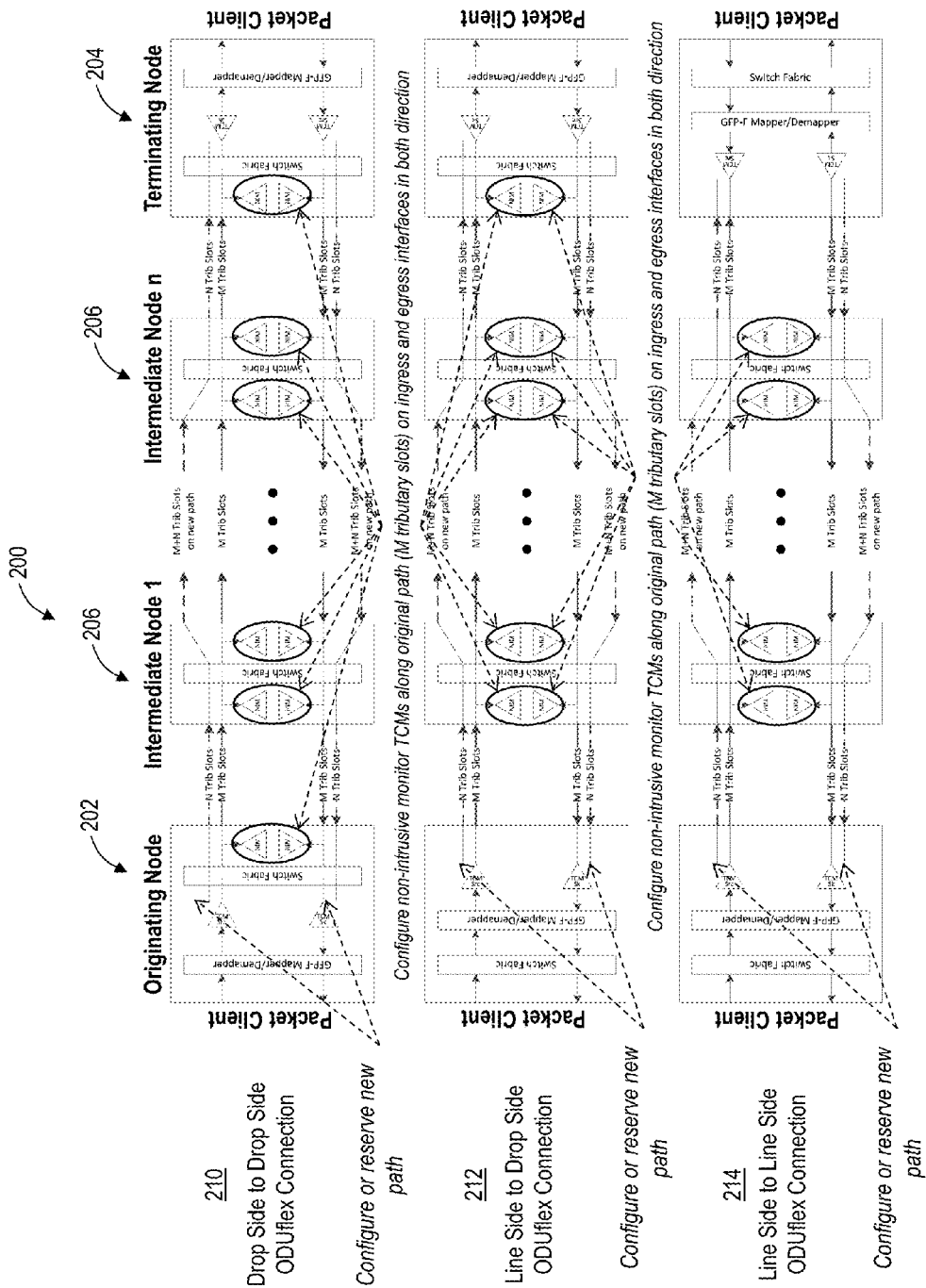
FIGS. 5-18 are network diagrams of the network of FIG. 3 illustrating various steps in the resizing increase operation of FIG. 4.

FIG. 5 illustrates the step 251 (Initiate ODUflex (GFP) Increase Resizing Operation) in the resizing increase operation 250. Here, a control plane call is issued to initiate the resizing increase operation 250. Based on the control plane call, each of the nodes 202, 204, 206 configures/reserves N tributary slot parallel path for segments where bandwidth is available and configures M+N tributary slot path for segments where sufficient bandwidth is not available along with associated M-to-M+N switching functions. Also, the nodes 202, 204, 206 configure non-intrusive monitoring TCMs along the original M tributary slot path (for resizing trigger detection)—non-intrusive monitors use the same TCM level as used at the originating and terminating nodes.

Figure 6:
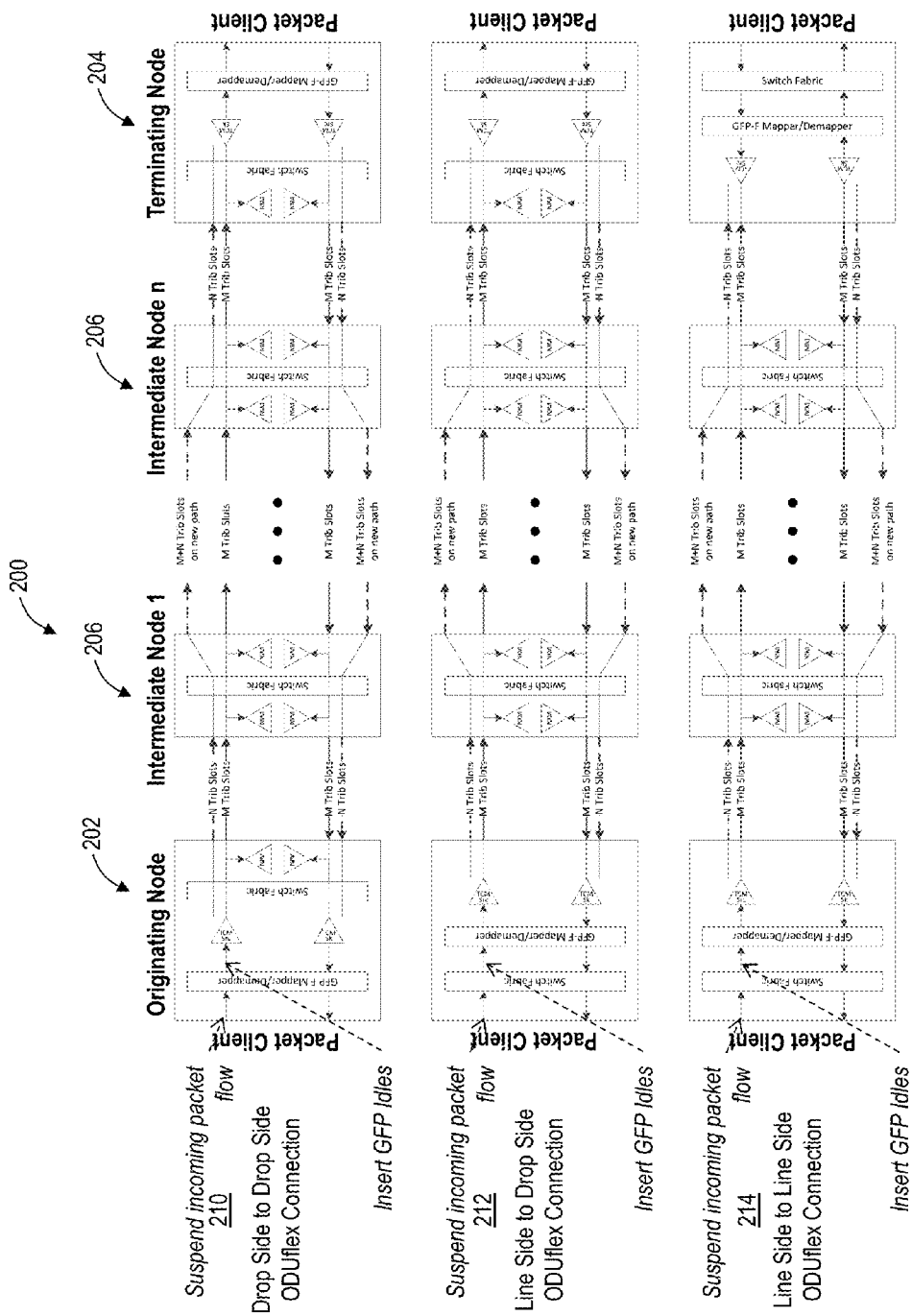

FIG. 6 illustrates the step 252 (Suspend Transport of Incoming Packet Flow) in the resizing increase operation 250. Here, the resizing increase operation 250 includes temporarily suspending GFP-F mapping of packets at the originating node 202, temporarily suspend the flow of incoming packets from the Packet Client via flow control (e.g., Pause Frames or Xon/Xoff) if possible, buffer incoming packets if flow control is not possible, and forcing the transmission of GFP Idle frames downstream so that no packet traffic is present along path during the resizing operation (minimizes loss of packets during resizing and may result in "hitless" operation).

Figure 7:
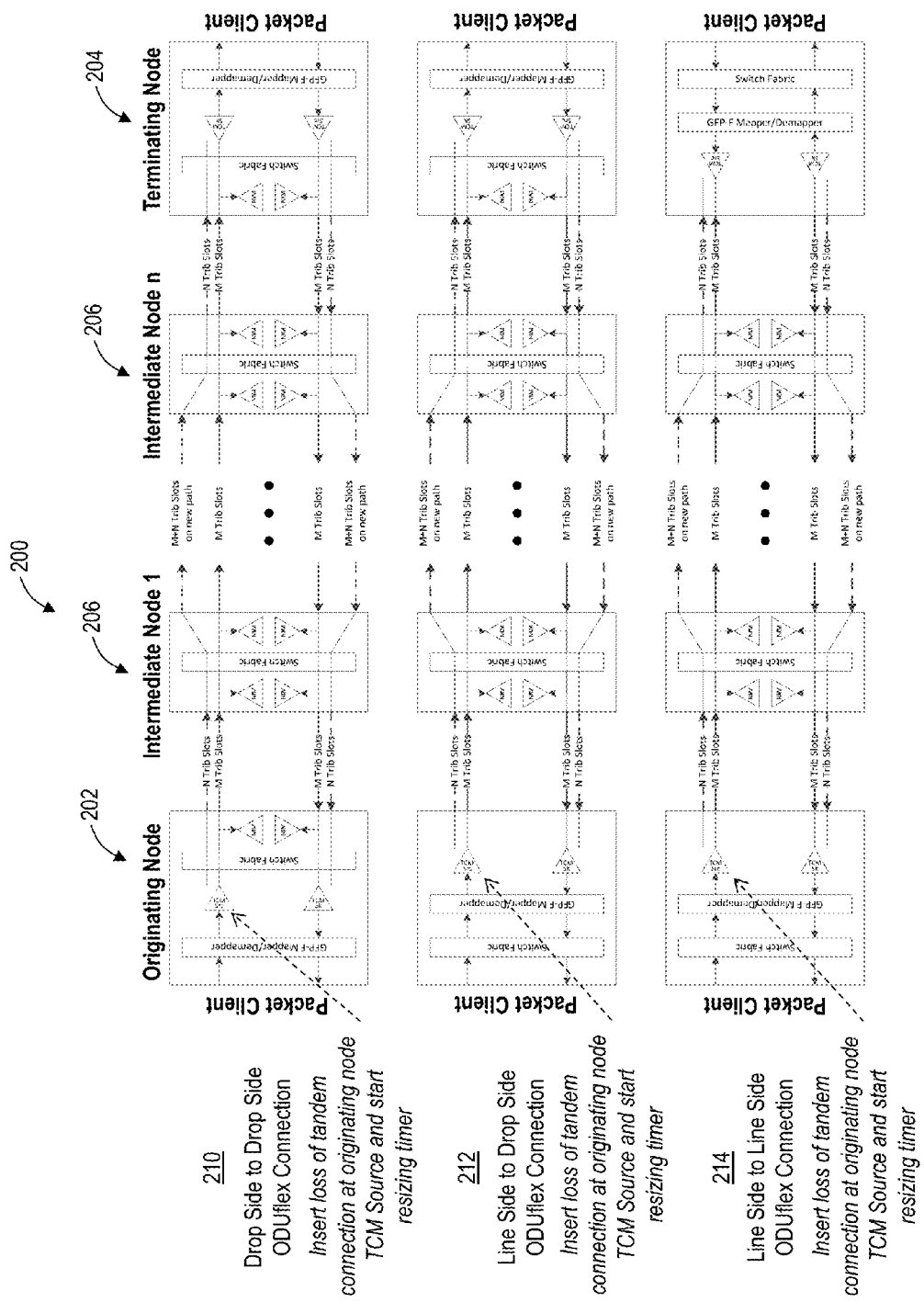

FIG. 7 illustrates the step 253 (Issue Path Resizing Trigger) in the resizing increase operation 250. Here, the resizing increase operation 250 includes issuing a path resizing trigger in originating to terminating direction, setting TCM source at originating to transmit all-zeroes in TCM bytes associated with end-to-end connection monitor, or send control plane resizing trigger message along original path (M tributary slots), and starting a timer tuned to the worst case resizing reconfiguration time for any single node (at expiry of this timer all nodes should have completed their local resizing operations and transport of packet flows may be resumed).

Figure 8:
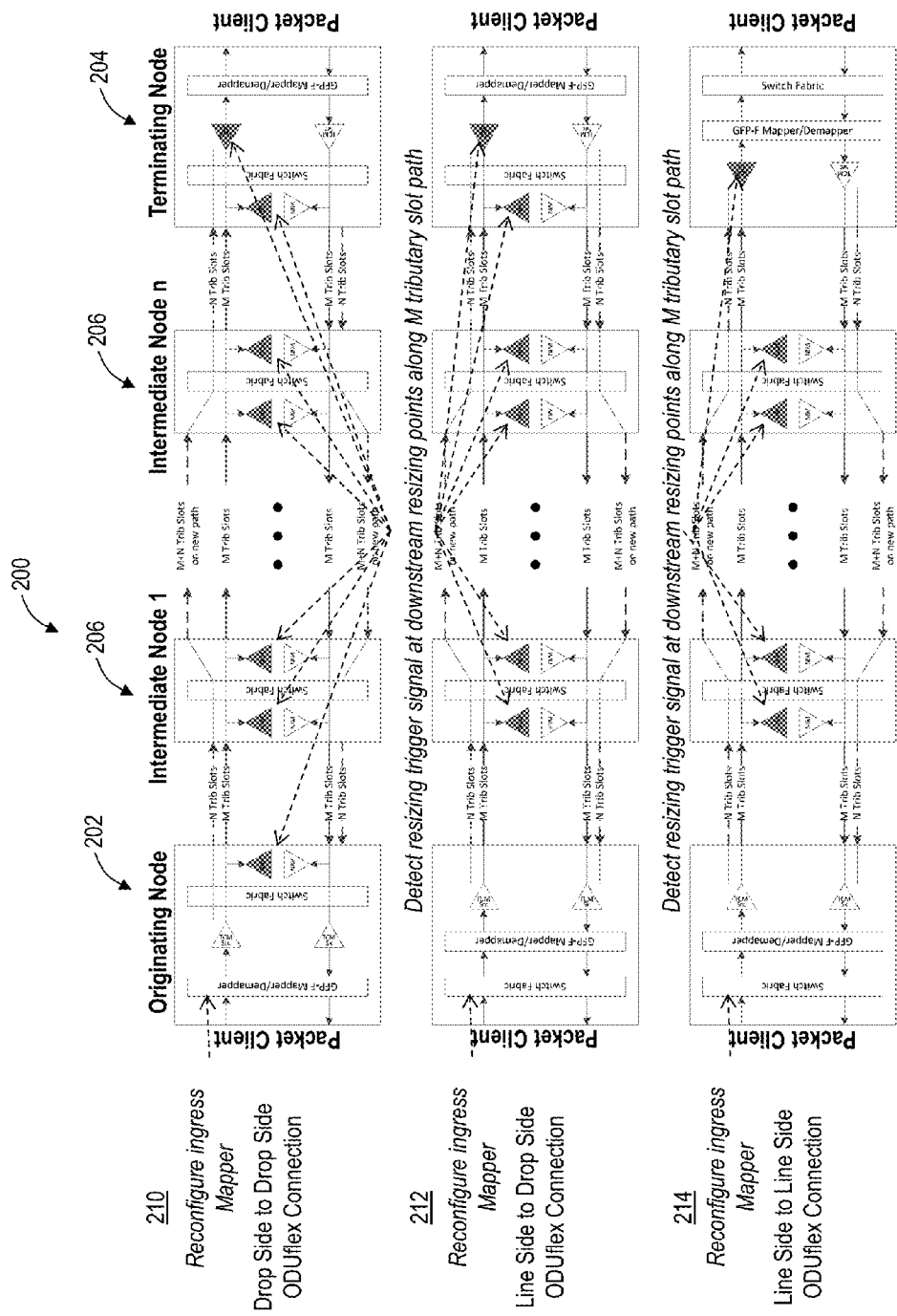

FIG. 8 illustrates the step 254 (Initiate Local Node Resizing Operations) in the resizing increase operation 250. Here, the resizing increase operation 250 reconfigures the originating interface by reconfiguring the GFP-F mapper for M+N tributary slots operation. The resizing increase operation 250 also detects resizing trigger at all downstream interfaces either as a control plane signaling message or in-band trigger (Loss of Tandem Connection shown here provides ~3.5-300 us detection time depending on ODUflex rate). The resizing operations occur at each of the nodes 202, 204, 206 in parallel.

Figure 9:
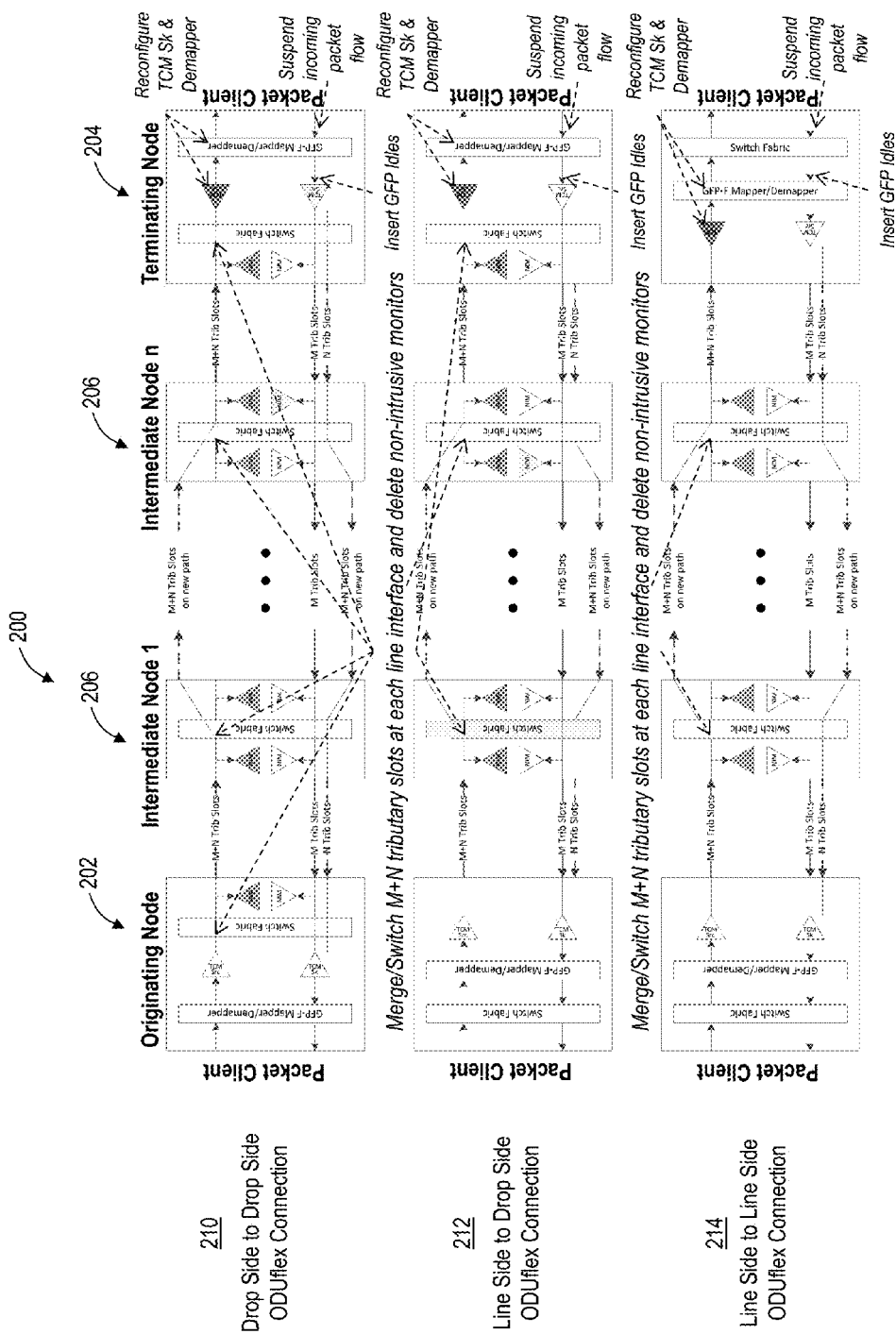
Figure 10:
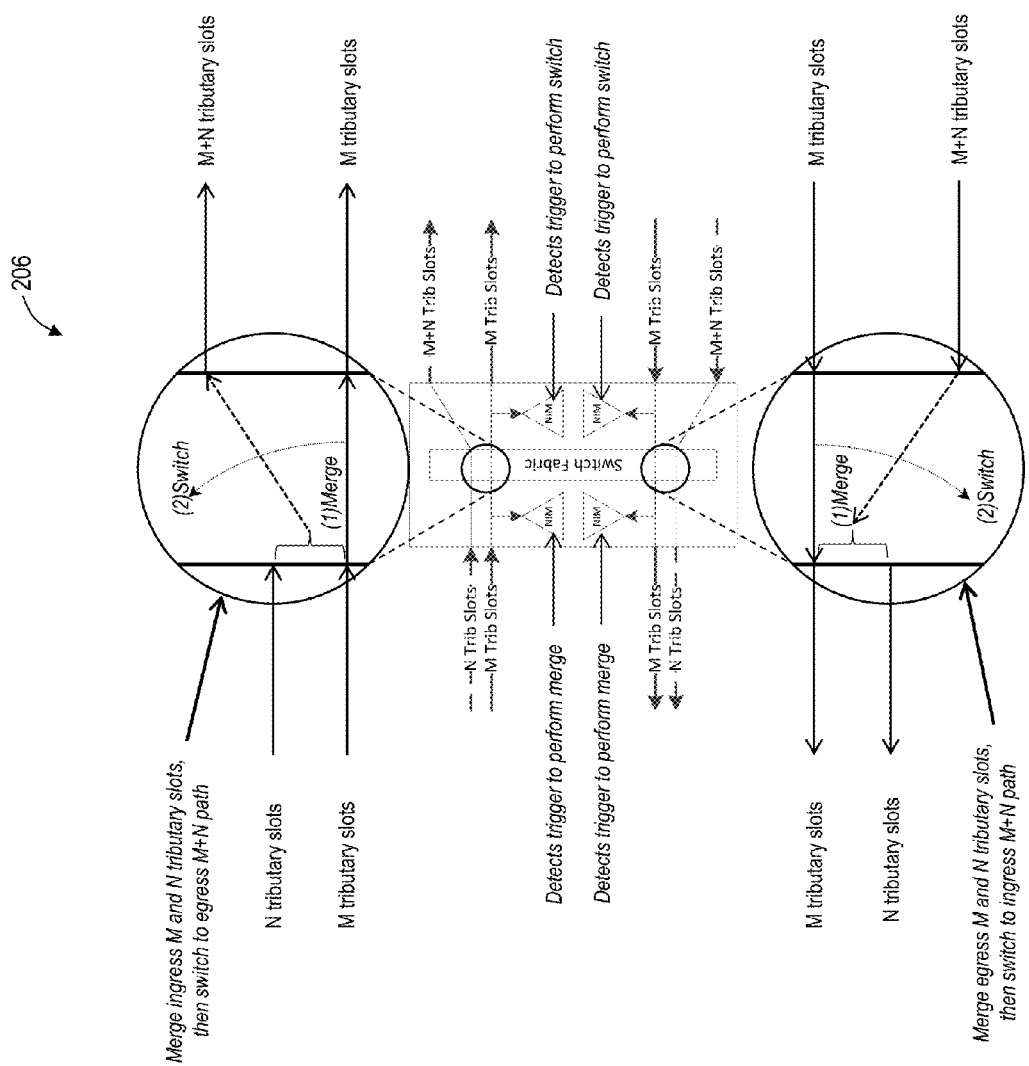
Figure 11:
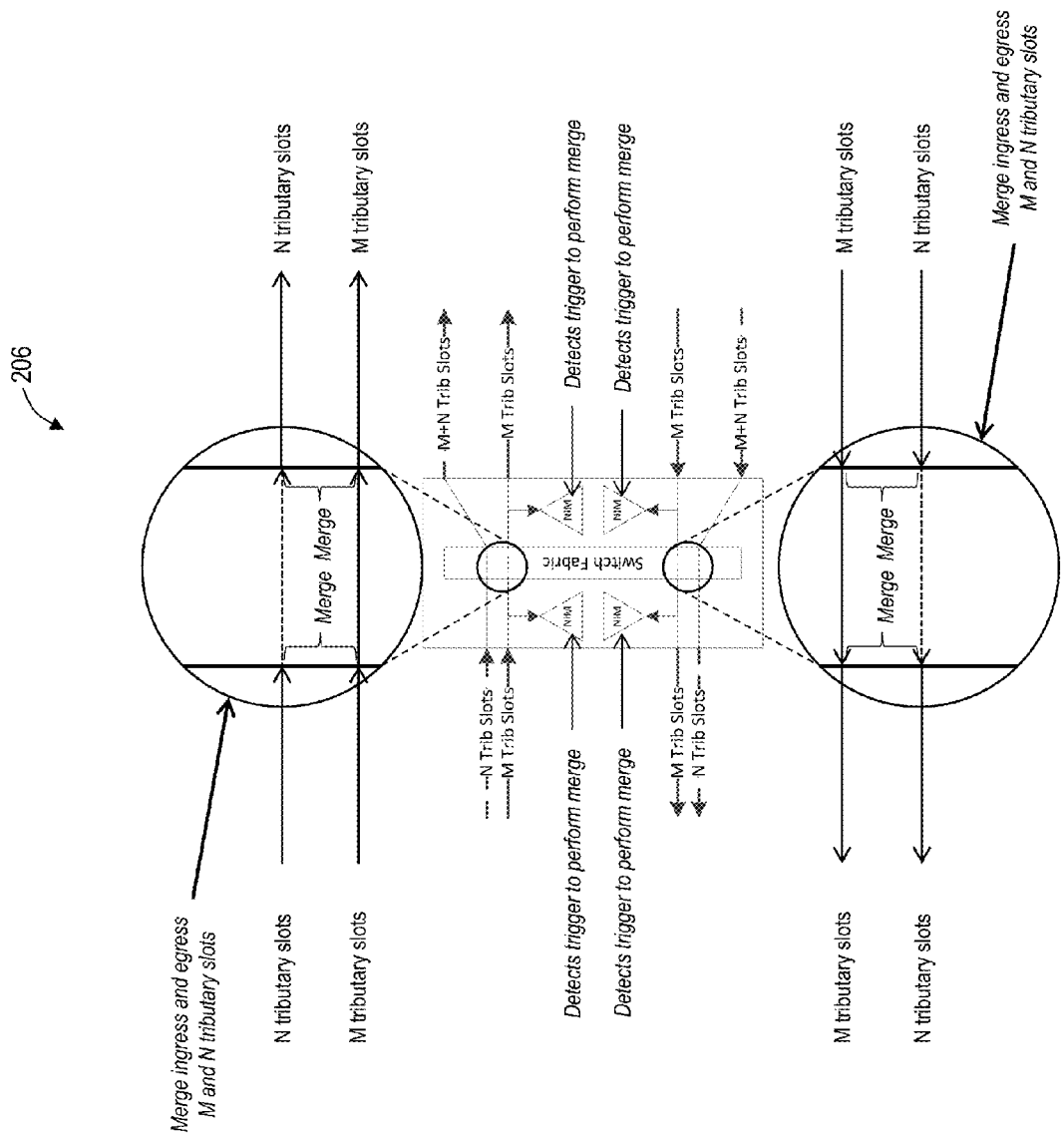

FIG. 9 illustrates the step 255 (Perform Path Resizing) in the resizing increase operation 250. Here, the resizing increase operation 250 locally resizes each line interface (as illustrated in FIGS. 10 and 11) then reconfigures the terminating interface. This can include reconfiguring the TCM sink function and the GFP-F demapper for M+N tributary slots operation, temporarily suspend the flow of incoming packets from the Packet Client via flow control (e.g., Pause Frames or Xon/Xoff) if possible, buffer incoming packets if flow control is not possible, and forcing the transmission of GFP Idle frames downstream so that no packet traffic is present along path during the resizing operation (minimizes loss of packets during resizing and may result in "hitless" operation).

FIG. 10 illustrates the path resizing at the nodes 206 with merge and switch operations. Here, each line interface is locally resized. At interfaces with M and N tributary slot paths, the M tributary slot path is merged with the N tributary slot path by reconfiguring the Multiplex Structure Identifier (MSI) tables at the interface for the N tributary slot path to the same tributary port number as used for the M tributary slot path. At interfaces with M+N and N tributary slot paths, the M tributary slot path is switched to the M+N tributary slot path. The non-intrusive monitoring TCM used to trigger the resizing operation (if they exist) are deleted.

FIG. 11 illustrates the path resizing at nodes with merge operations only. Again, each line interface is locally resized. At interfaces with M and N tributary slot paths, the M tributary slot path is merged with the N tributary slot path by reconfiguring the MSI tables at the interface for the N tributary slot path to the same tributary port number as used in the M tributary slot path. The non-intrusive monitoring TCM used to trigger the resizing operation (if they exist) are deleted.

Figure 12:
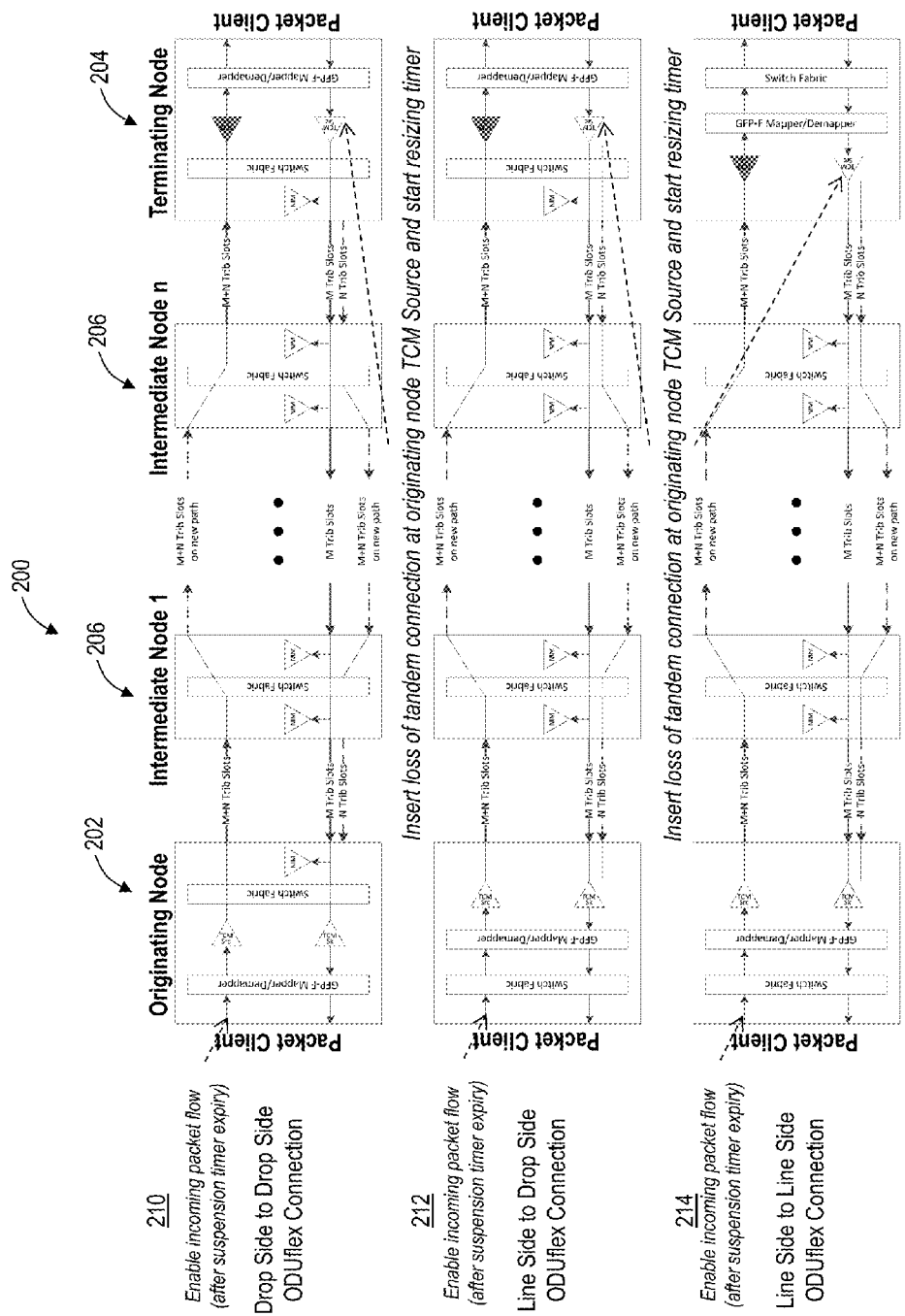

FIG. 12 illustrates the step 256 (Issue Path Resizing Trigger) in the resizing increase operation 250. Here, the resizing increase operation 250 issues a path resizing trigger in the terminating to originating direction, sets TCM source at terminating to transmit all-zeroes in TCM bytes associated with end-to-end connection monitor, or send control plane resizing trigger message along original path (M tributary slots), start a timer tuned to the worst case resizing reconfiguration time for any single node (at expiry of this timer all nodes should have completed their local resizing operations and transport of packet flows may be resumed), begins packet transport at the originating node 202 (to the destination node 204), and enables packet transport at the originating node 202 (remove insertion of only GFP-F Idle frames).

Figure 13:
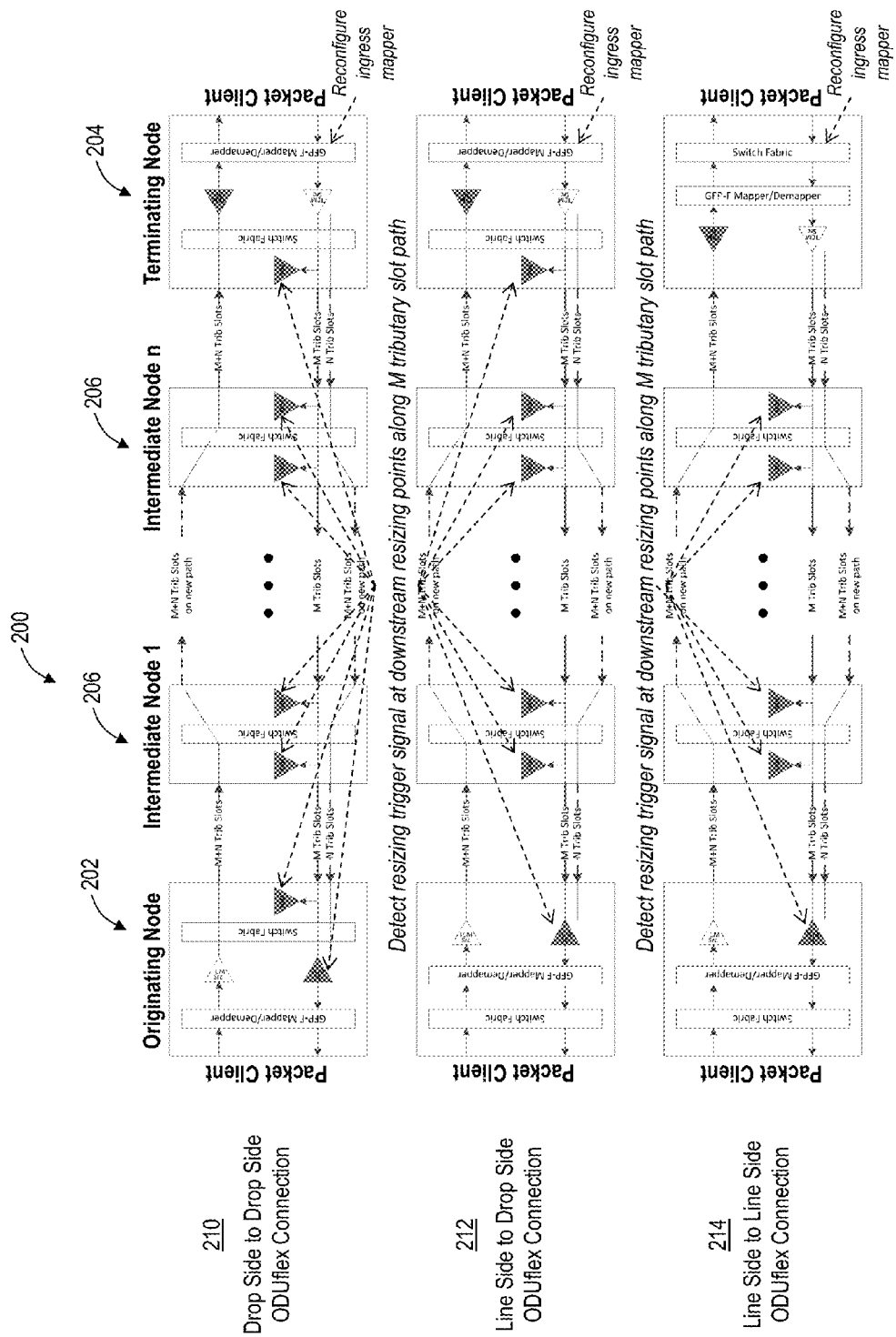

FIG. 13 illustrates the step 257 (Initiate Local Node Resizing Operations) in the resizing increase operation 250. Here, the resizing increase operation 250 the terminating interfacing and reconfigures the GFP-F mapper for M+N tributary slots operation. The resizing increase operation 250 also detects resizing trigger at all downstream interfaces via either control plane signaling message or in-band trigger may be used (Loss of Tandem Connection shown here provides ~3.5-300 us detection time depending on ODUflex rate). Also, the resizing operations at each of the nodes 202, 204, 206 occur in parallel.

Figure 14:
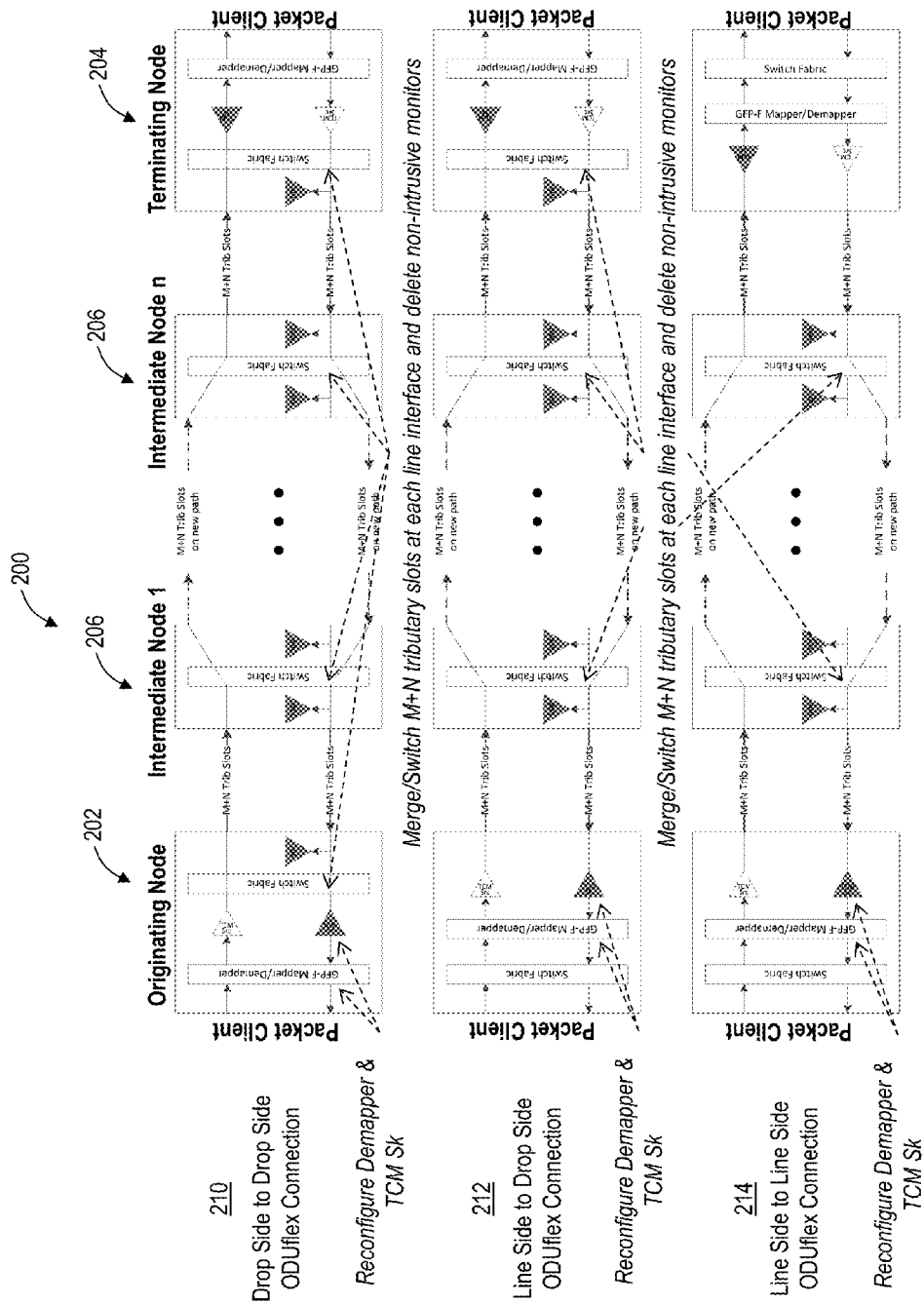

FIG. 14 illustrates the step 258 (Perform Path Resizing) in the resizing increase operation 250. Here, the resizing increase operation 250 locally resizes each line interface (as illustrated in FIGS. 10 and 11) then reconfigures the originating interface. The resizing increase operation 250 also reconfigures the TCM sink function (if it exists) and the GFP-F demapper for M+N tributary slots operation.

Figure 15:
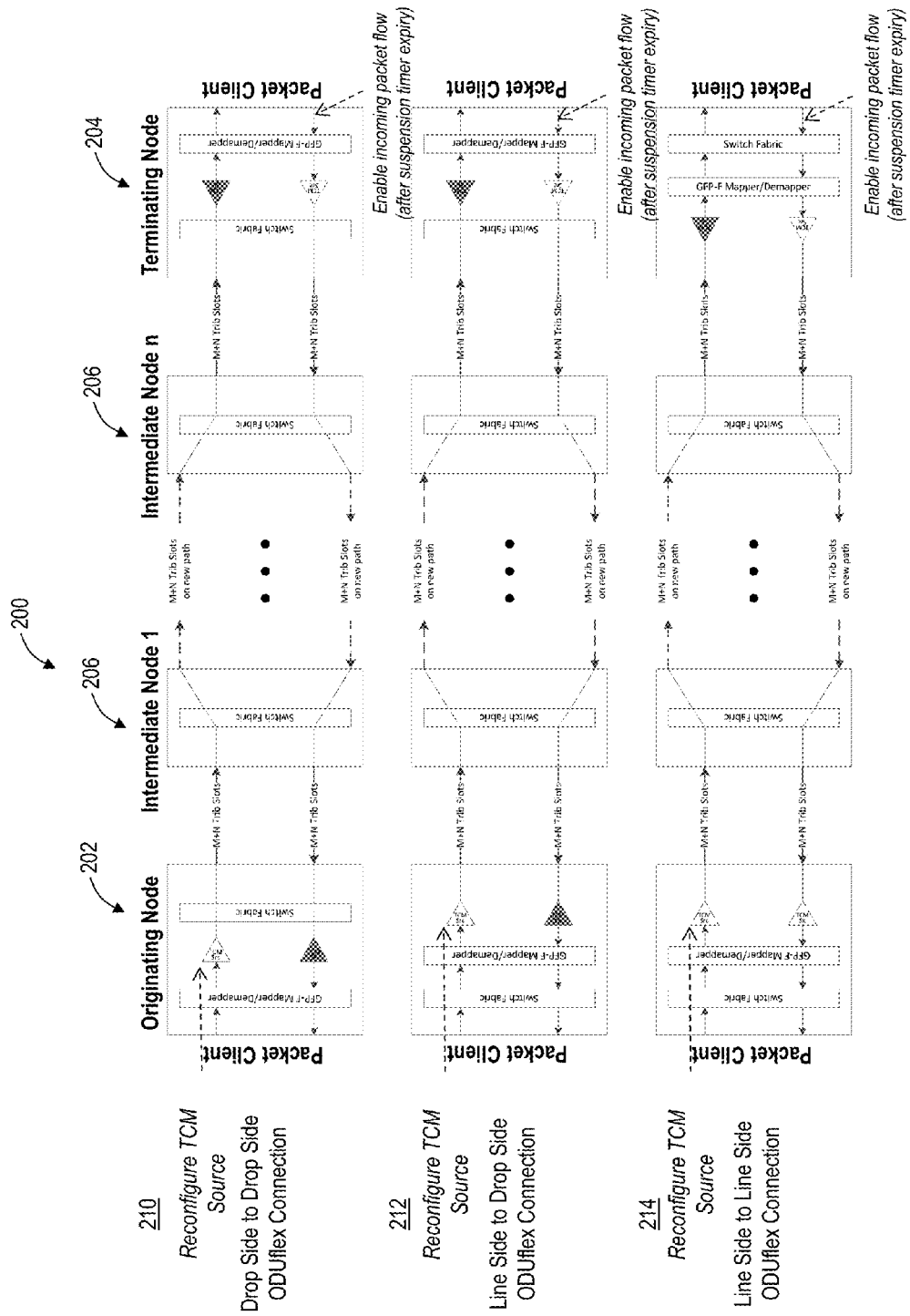
Figure 16:
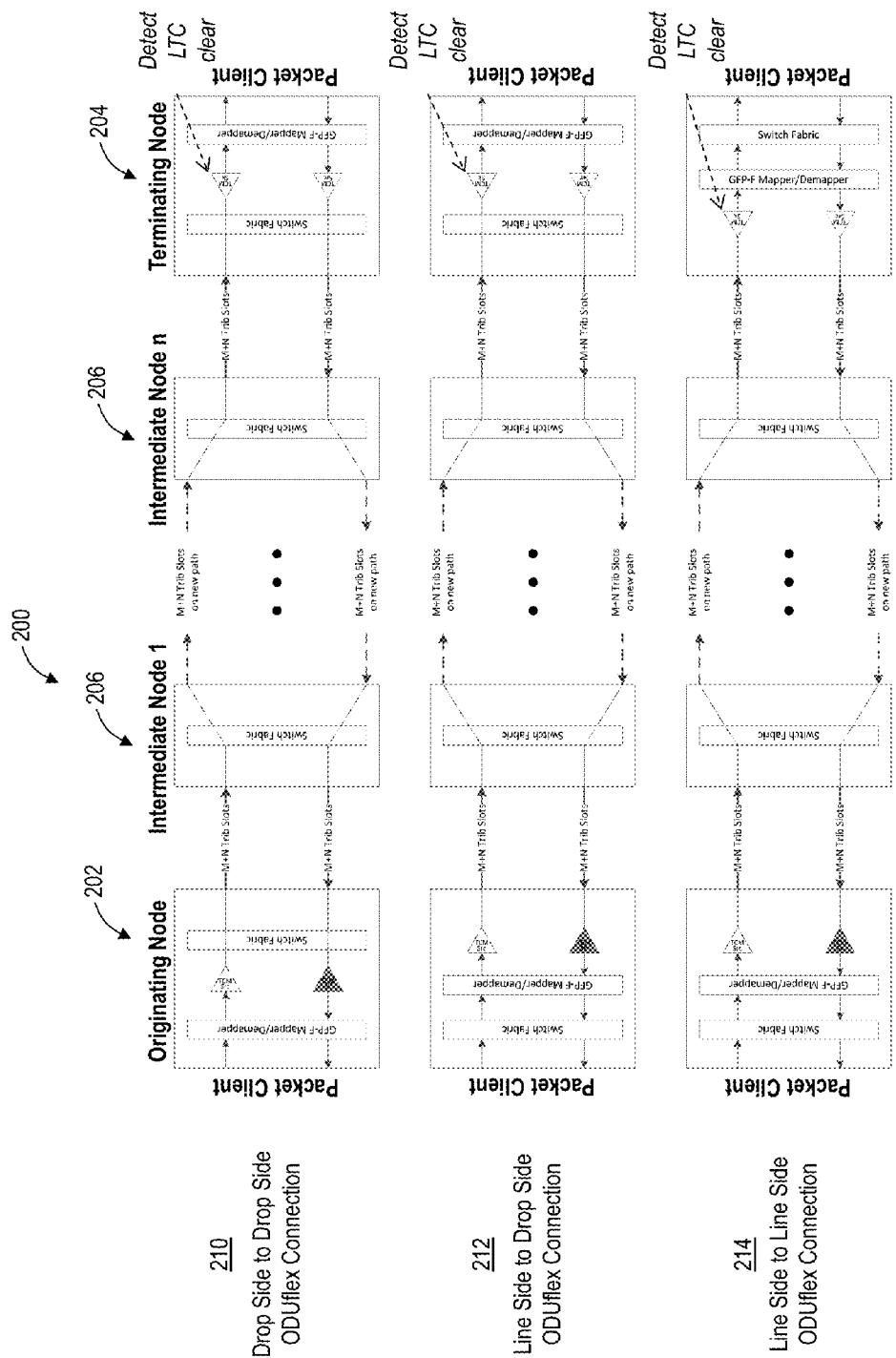
Figure 17:
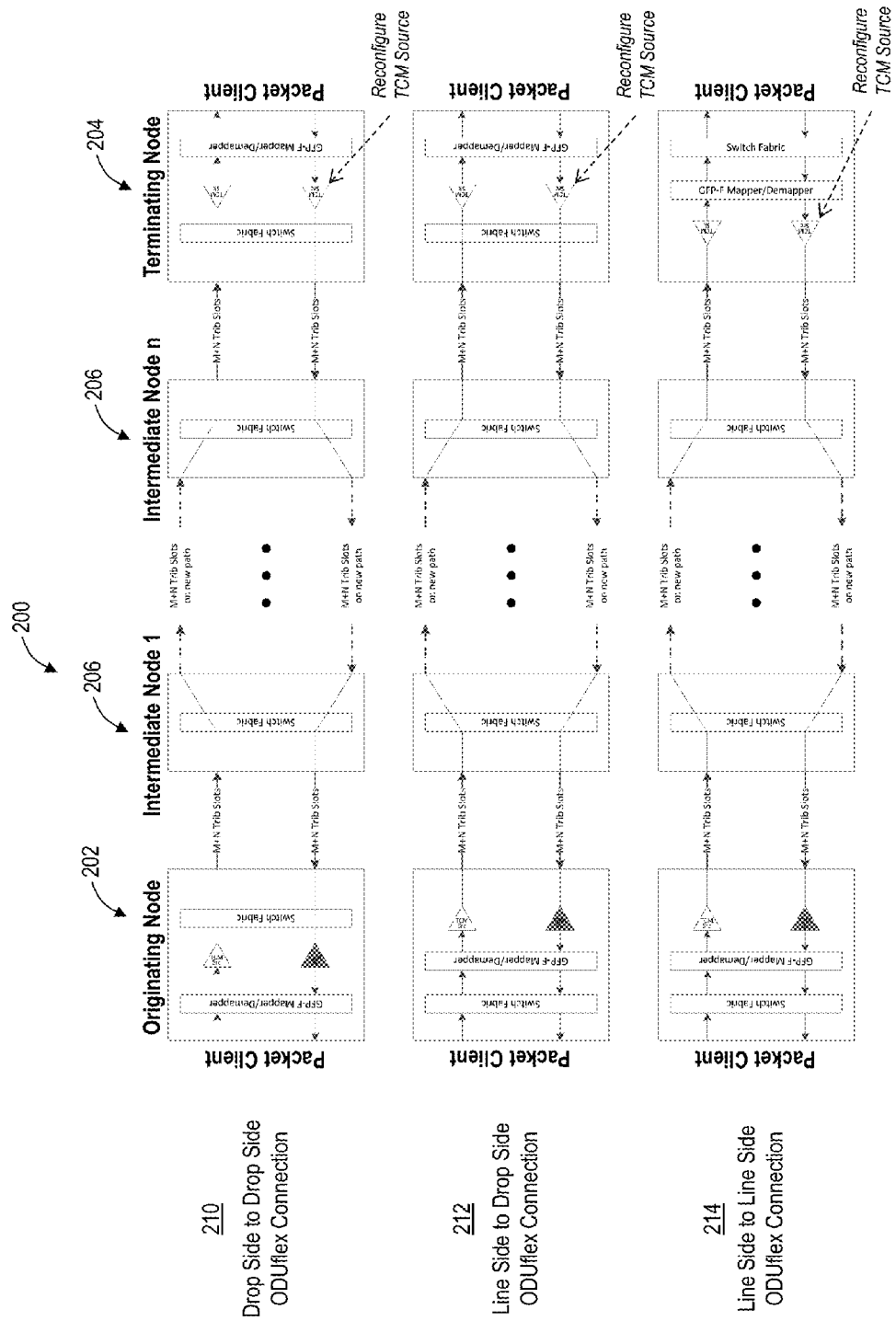
Figure 18:
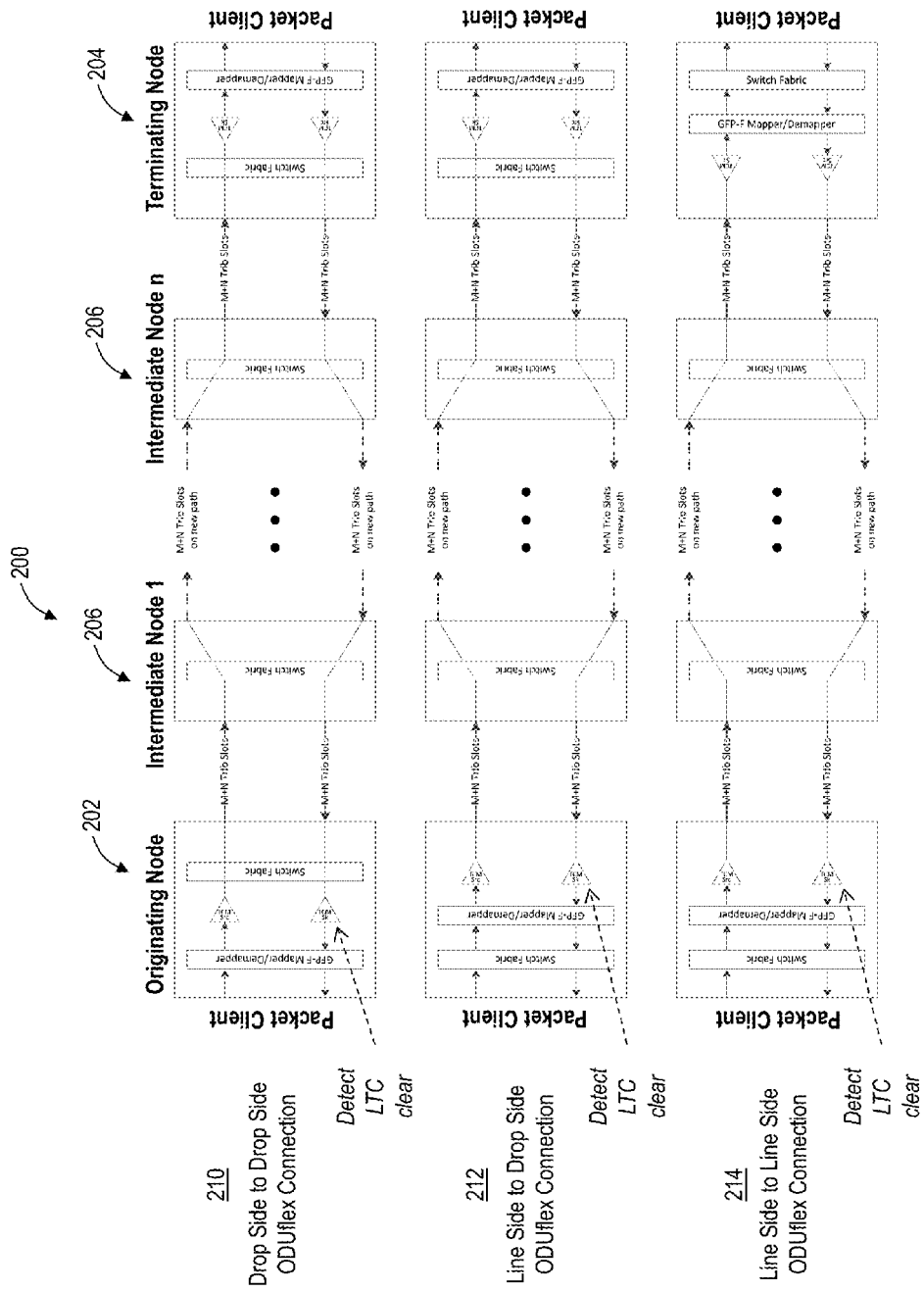

FIGS. 15-18 illustrates the step 259 (Initiate Resizing Complete Acknowledgment) in the resizing increase operation 250. In FIG. 15, this includes inserting valid Tandem Connection (LTC) at originating node, setting the TCM source at the originating node 202 to transmit valid TCM bytes associated with M+N tributary slot end-to-end connection monitor, beginning packet transport at the 204 terminating node, and enabling packet transport at the terminating node 204 (remove the insertion of only GFP-F Idle frames). In FIG. 16, this includes detecting a valid Tandem Connection (LTC) at the originating node 202 and detecting clear of end-to-end loss of tandem connection at the originating node 202. In FIG. 17, this includes inserting a valid Tandem Connection (LTC) at the terminating node 204 and setting the TCM source at the terminating node 204 to transmit valid TCM bytes associated with M+N tributary slot end-to-end connection monitor. In FIG. 18, this includes detecting valid Tandem Connection (LTC) at the originating node 202, and detecting clear of end-to-end loss of tandem connection at the originating node 202.

Resizing Decrease Operation

Figure 19:
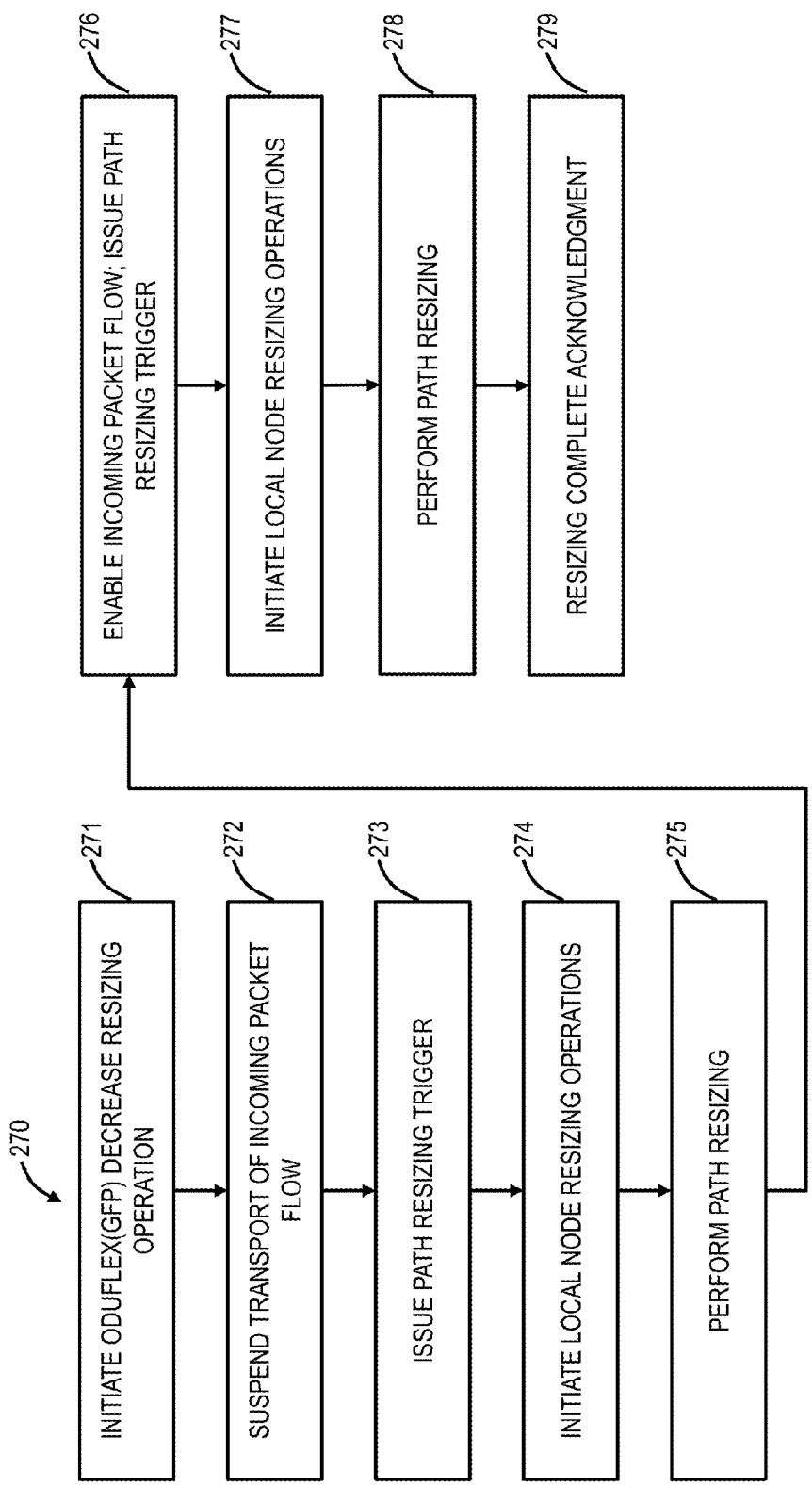
FIG. 19 is a flowchart of an example of a resizing decrease operation using the control plane and OTN overhead (TCMs) to signal the resizing operation.

FIG. 19 is a flowchart of an example of a resizing decrease operation 270 using the control plane and OTN overhead (TCMs) to signal the resizing operation, and FIGS. 20-33 are network diagrams of the network 200 illustrating various steps in the resizing decrease operation 270. The resizing decrease operation 270 includes initiating ODUflex (GFP) decrease resizing operation (step 271), suspending transport of incoming packet flow (step 272), issuing path resizing trigger (step 273), initiating local node resizing operations (step 274), performing path resizing (step 275), enabling incoming packet flow; issuing path resizing trigger (in opposite direction) (step 276), initial local node resizing operations (step 277), perform path resizing (step 278), and initiating resizing complete acknowledgment (step 279).

Figure 20:
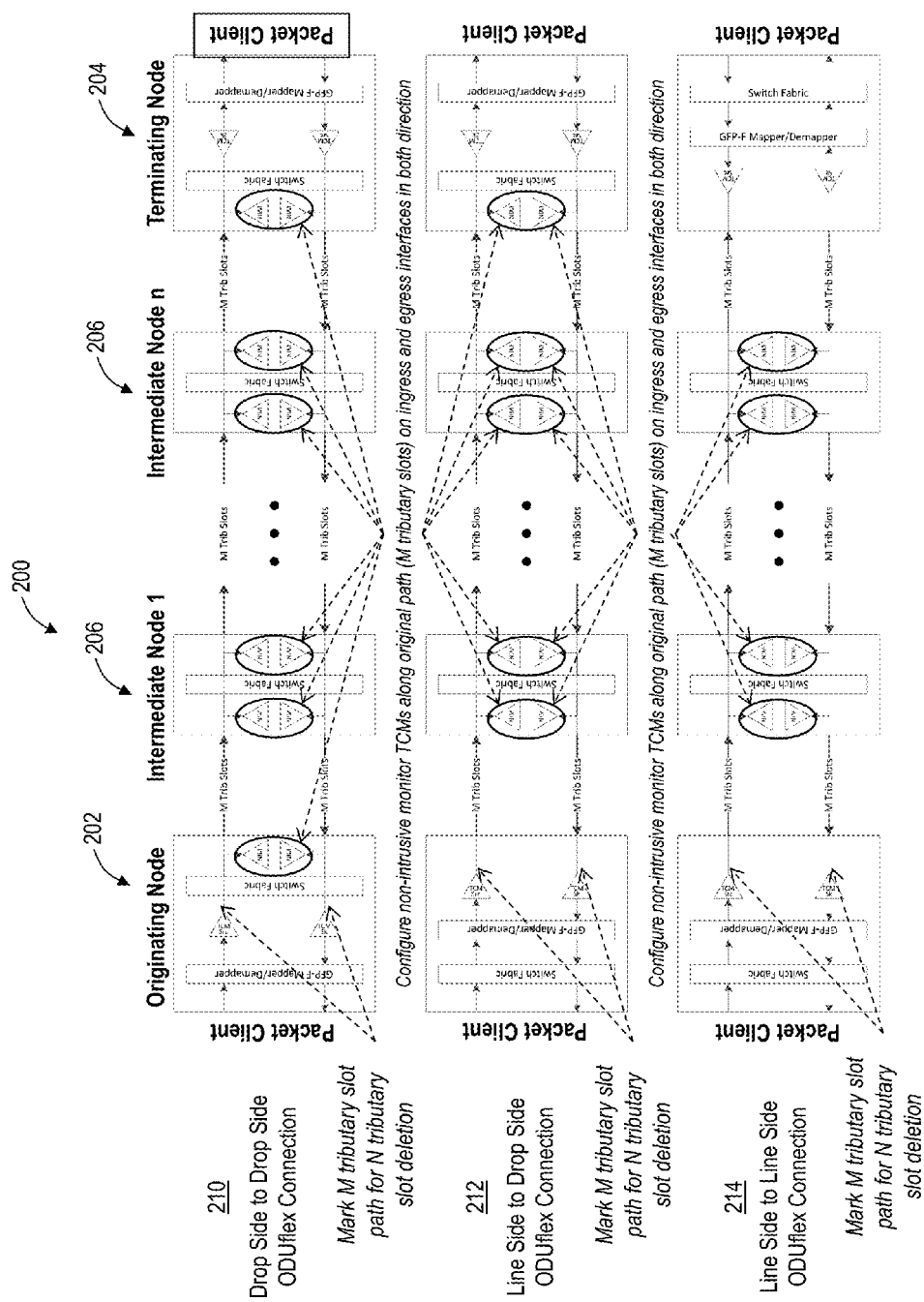
FIGS. 20-33 are network diagrams of the network of FIG. 3 illustrating various steps in the resizing decrease operation of FIG. 19.

FIG. 20 illustrates the step 271 (Initiate ODUflex (GFP) Decrease Resizing Operation) in the resizing decrease operation 270. Here, the resizing decrease operation 270 issues a control plane call to initiate the resizing operation, marking an M tributary slot path for deletion of N tributary slots, and configuring non-intrusive monitoring TCMs along the original M tributary slot path (for resizing trigger detection)—non-intrusive monitors use the same TCM level as used at the originating and terminating nodes 202, 204.

Figure 21:
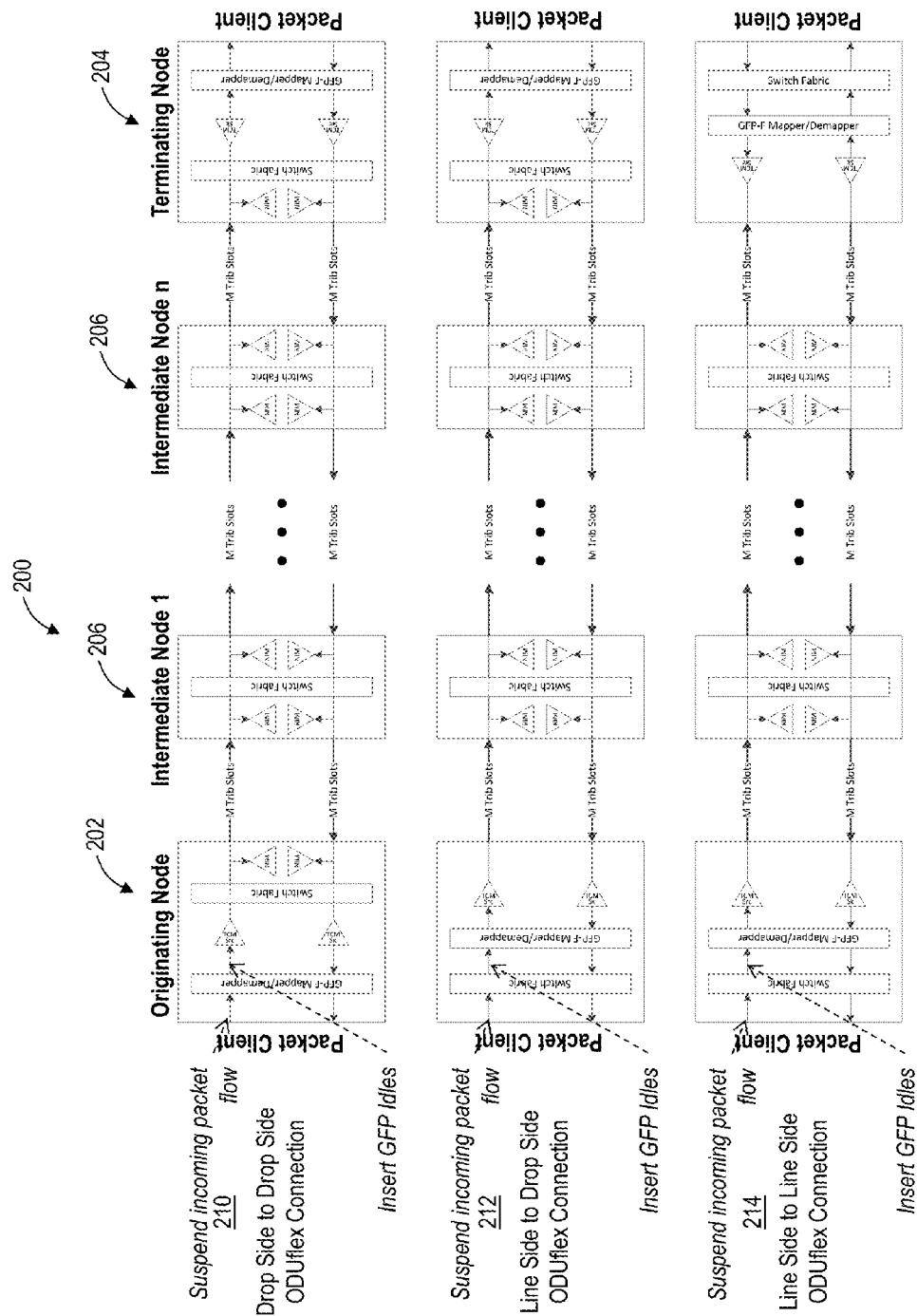

FIG. 21 illustrates the step 272 (Suspend Transport of Incoming Packet Flow) in the in the resizing decrease operation 270. Here, the resizing decrease operation 270 temporarily suspends GFP-F mapping of packets at the originating node 202, temporarily suspending the flow of incoming packets from the Packet Client via flow control (e.g., Pause Frames or Xon/Xoff) if possible, buffer incoming packets if flow control is not possible. The resizing decrease operation 270 also forces the transmission of GFP Idle frames downstream so that no packet traffic is present along path during the resizing operation (minimizes loss of packets during resizing and may result in "hitless" operation).

Figure 22:
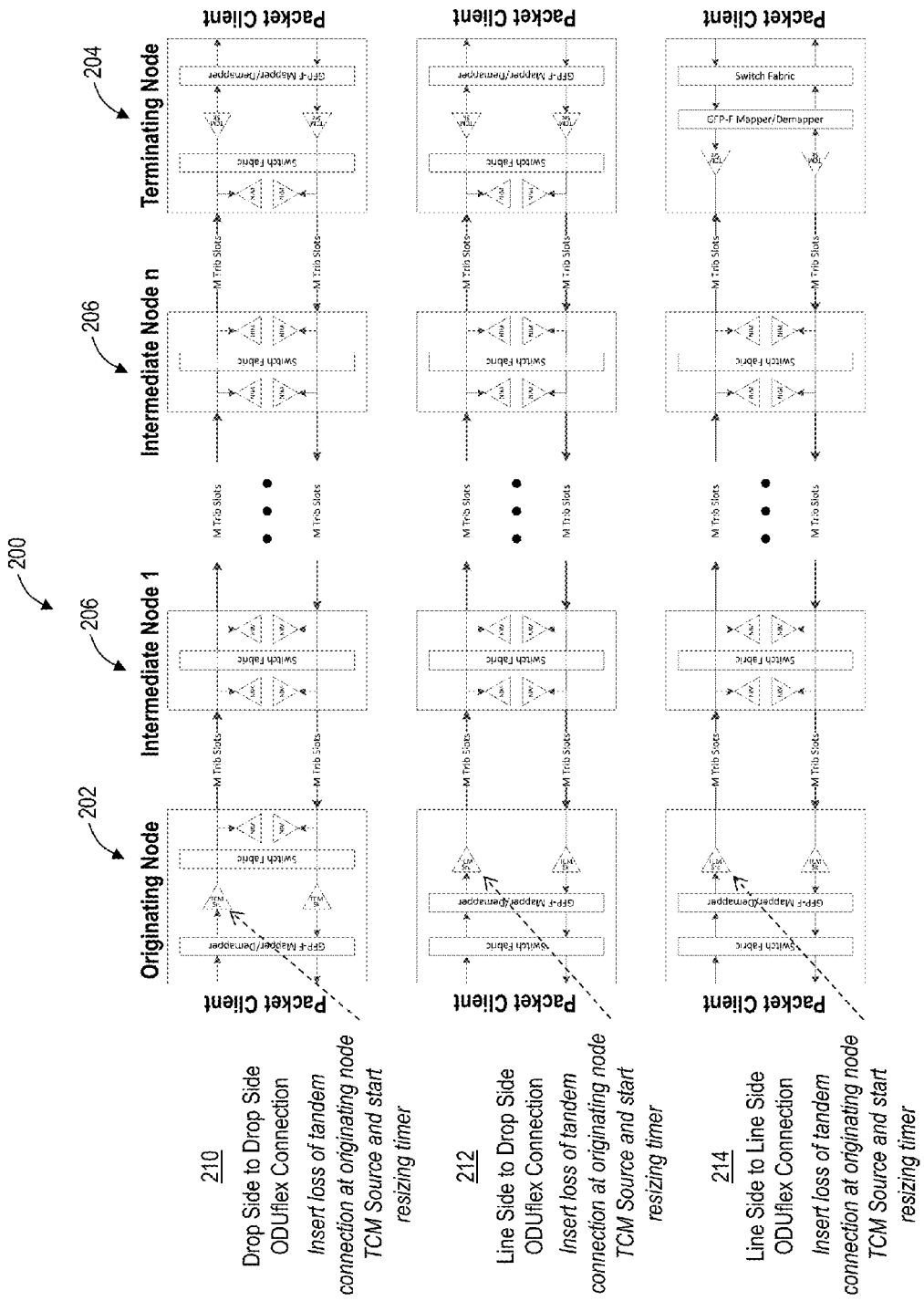

FIG. 22 illustrates the step 273 (Issue Path Resizing Trigger) in the resizing decrease operation 270. Here, the resizing decrease operation 270 includes issuing a path resizing trigger in the originating to terminating direction, setting the TCM source at the originating node 202 to transmit all-zeroes in TCM bytes associated with end-to-end connection monitor, or send control plane resizing trigger message along original path (M tributary slots), and starting a timer tuned to the worst case resizing reconfiguration time for any single node (at expiry of this timer all nodes should have completed their local resizing operations and transport of packet flows may be resumed).

Figure 23:
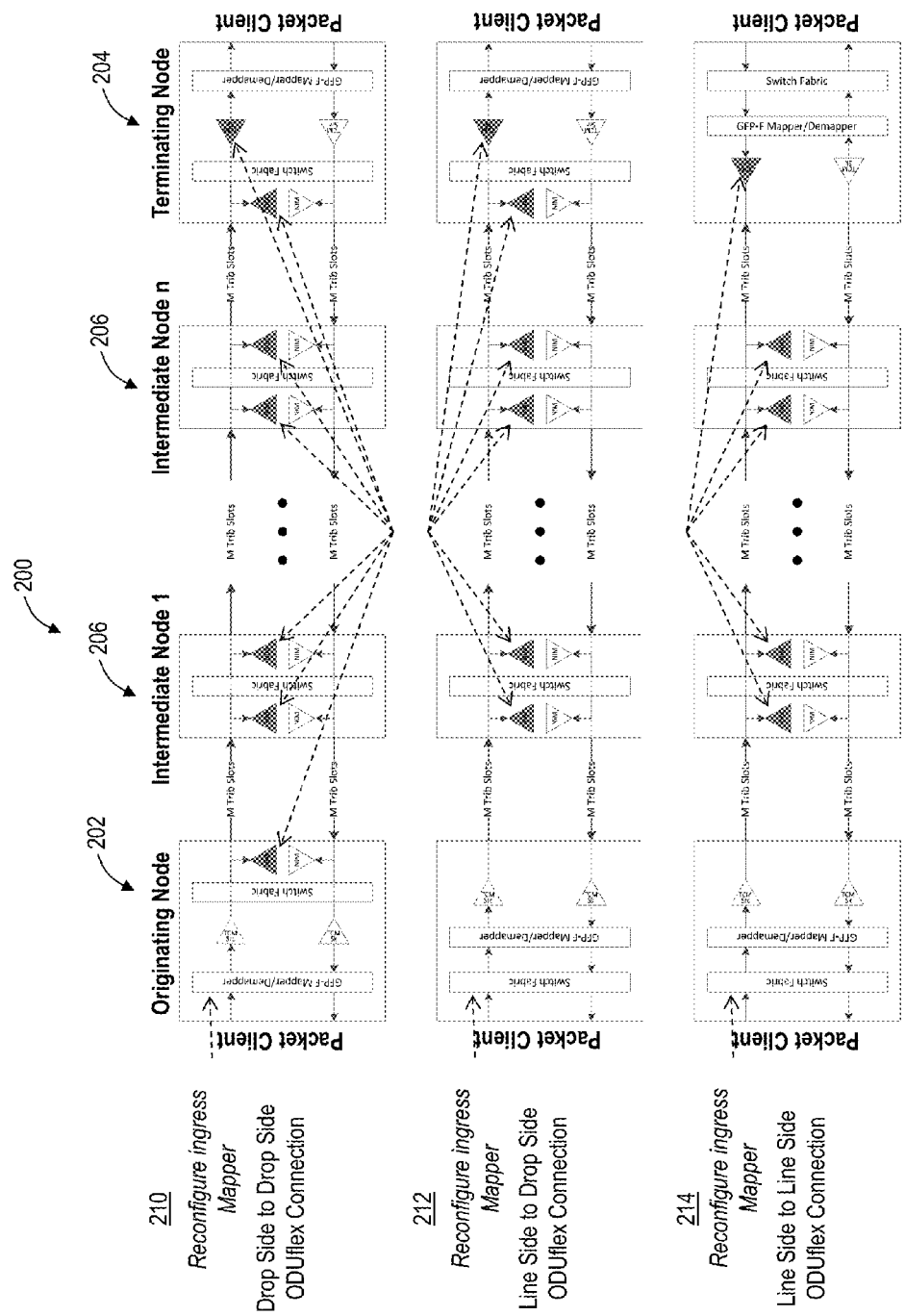

FIG. 23 illustrates the step 274 (Initiate Local Node Resizing Operations) in the resizing decrease operation 270. The resizing decrease operation 270 includes reconfiguring the originating interface by reconfiguring the GFP-F mapper for M–N tributary slots operation, detecting resizing trigger at all downstream interfaces via either control plane signaling message or in-band trigger may be used (Loss of Tandem Connection shown here provides ~3.5-300 us detection time depending on ODUflex rate). Again, the resizing operations at each node 202, 204, 206 occur in parallel.

Figure 24:
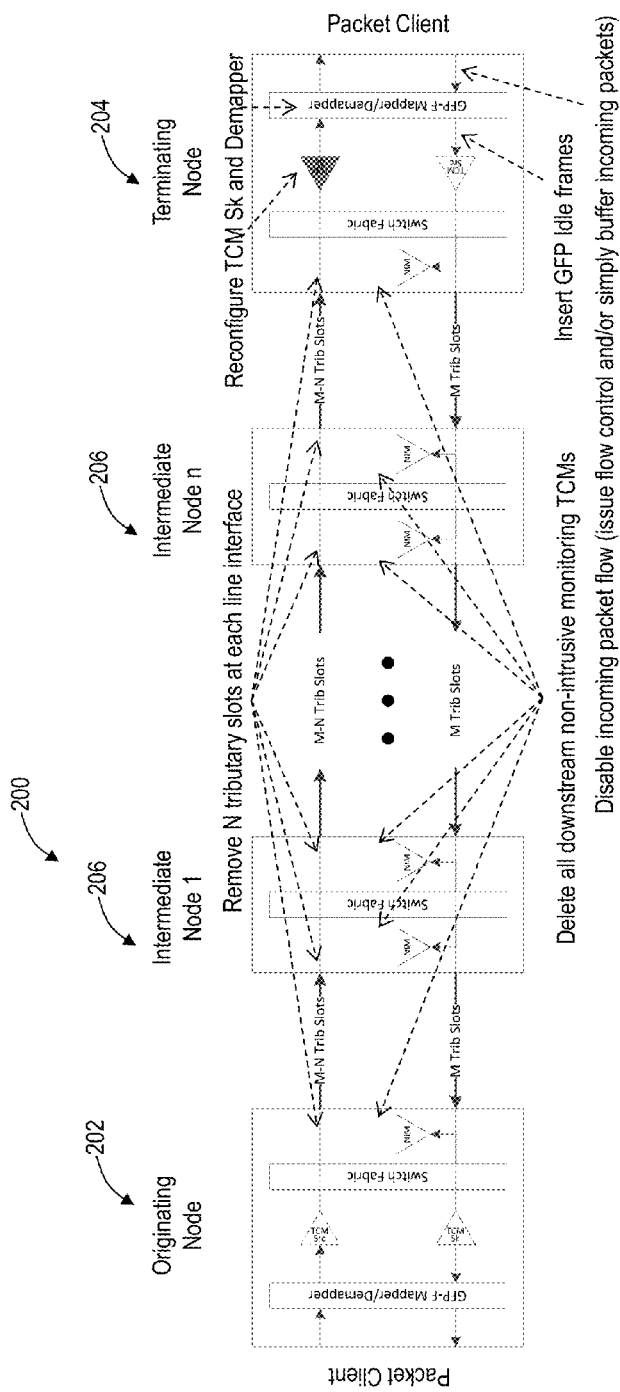
Figure 25:
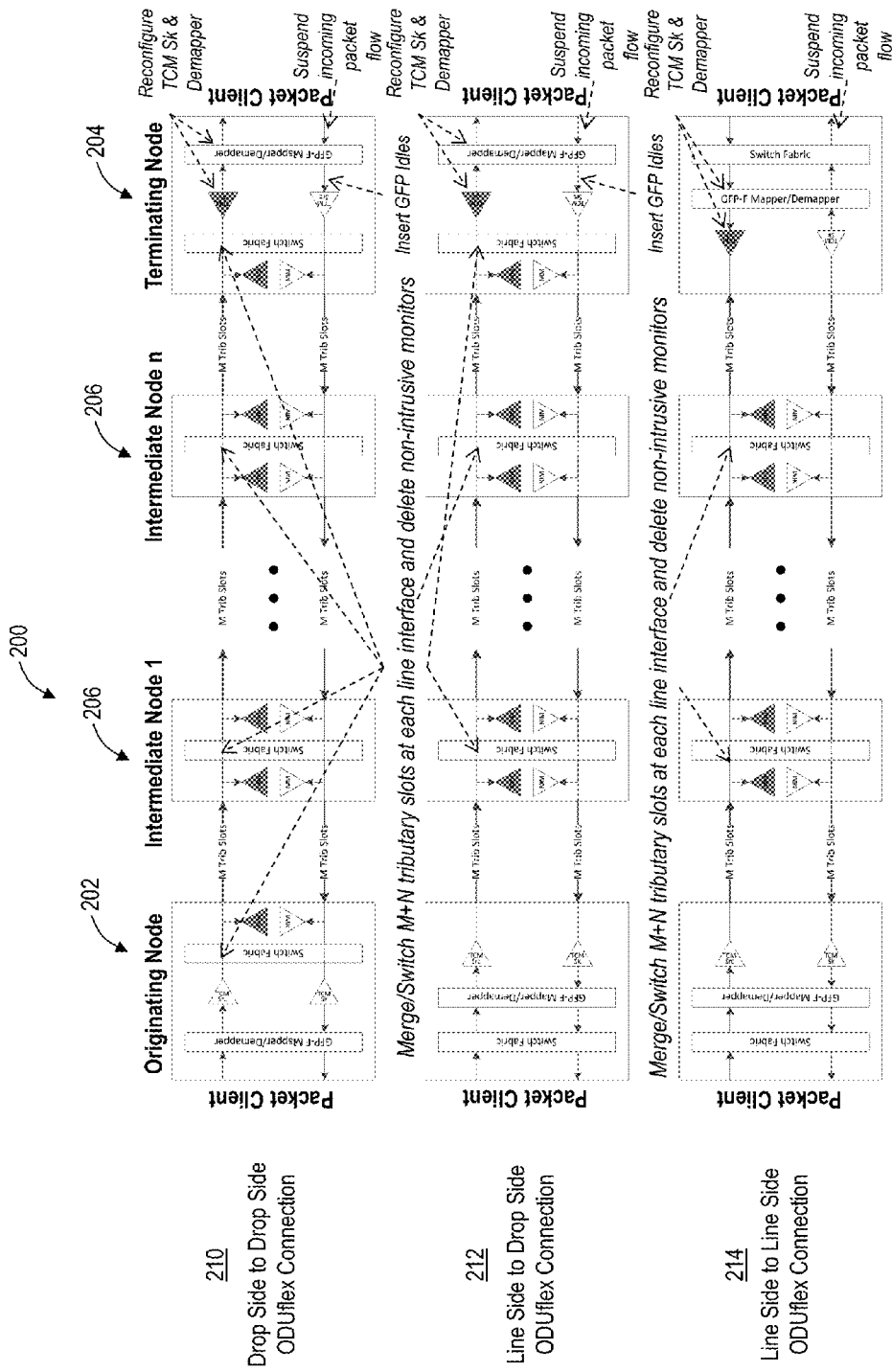

FIGS. 24-25 illustrate the step 275 (Perform Path Resizing) in the in the resizing decrease operation 270. In FIG. 24, the resizing decrease operation 270 locally resizes each line interface. Upon detection of the LTC at an interface (local to a line module), the resizing decrease operation 270 removes the N tributary slots from the M tributary slot path by reconfiguring the MSI tables at the interface for the N tributary slots to be unused. After completion of the MSI table reconfiguration, the resizing decrease operation 270 deletes the non-intrusive monitoring TCM used to trigger the resizing operation at the interface. The resizing decrease operation 270 reconfigure the terminating interface. Upon detection of the LTC at the terminating node (local to the egress line module), the resizing decrease operation 270 reconfigures the TCM sink function and the GFP-F demapper for M–N tributary slots operation. The resizing decrease operation 270 issues flow control commands (e.g., Pause Frames or Xon/Xoff) to temporarily suspend the flow of incoming packets from the Packet Client at terminating node if possible, but buffer incoming packets if flow control is not possible. The resizing decrease operation 270 forces the transmission of GFP Idle frames downstream so that no packet traffic is present during the resizing operation (minimizes loss of packets during resizing resulting in "hitless" operation).

In FIG. 25, the resizing decrease operation 270 locally resizes each line interface (see FIG. 26) then reconfigures the terminating interface. This includes reconfiguring the TCM sink function and the GFP-F demapper for M+N tributary slots operation, temporarily suspending the flow of incoming packets from the Packet Client via flow control (e.g., Pause Frames or Xon/Xoff) if possible, buffer incoming packets if flow control is not possible, and forcing the transmission of GFP Idle frames downstream so that no packet traffic is present along path during the resizing operation (minimizes loss of packets during resizing and may result in "hitless" operation).

Figure 26:
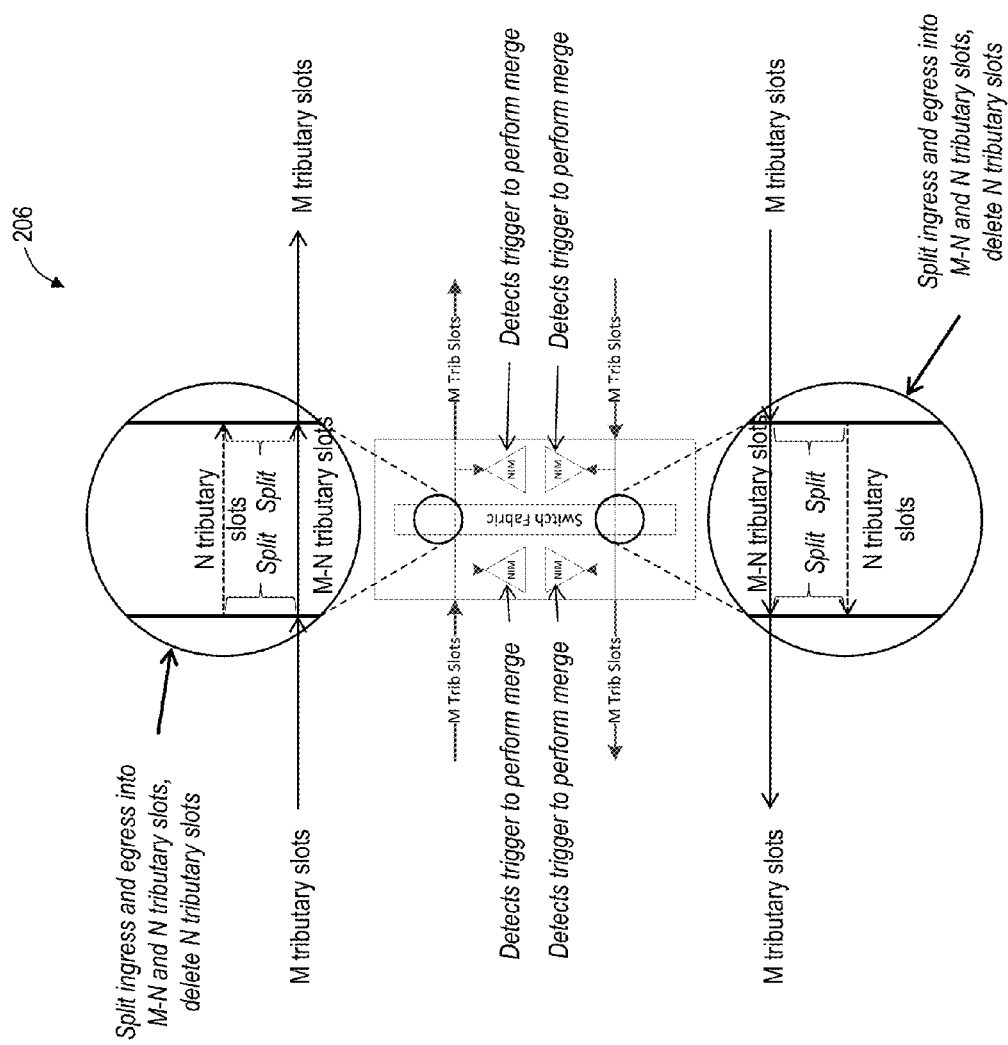

FIG. 26 illustrates the path resizing at the nodes 206 with split operations. This includes locally resizing each line interface. At interfaces with M tributary slot paths, the M tributary slot path are split into M–N and N tributary slot segments by reconfiguring the MSI tables at the interface, the N tributary slot cross-connections are deleted, and the non-intrusive monitoring TCM used to trigger the resizing operation (if they exist) are deleted.

Figure 27:
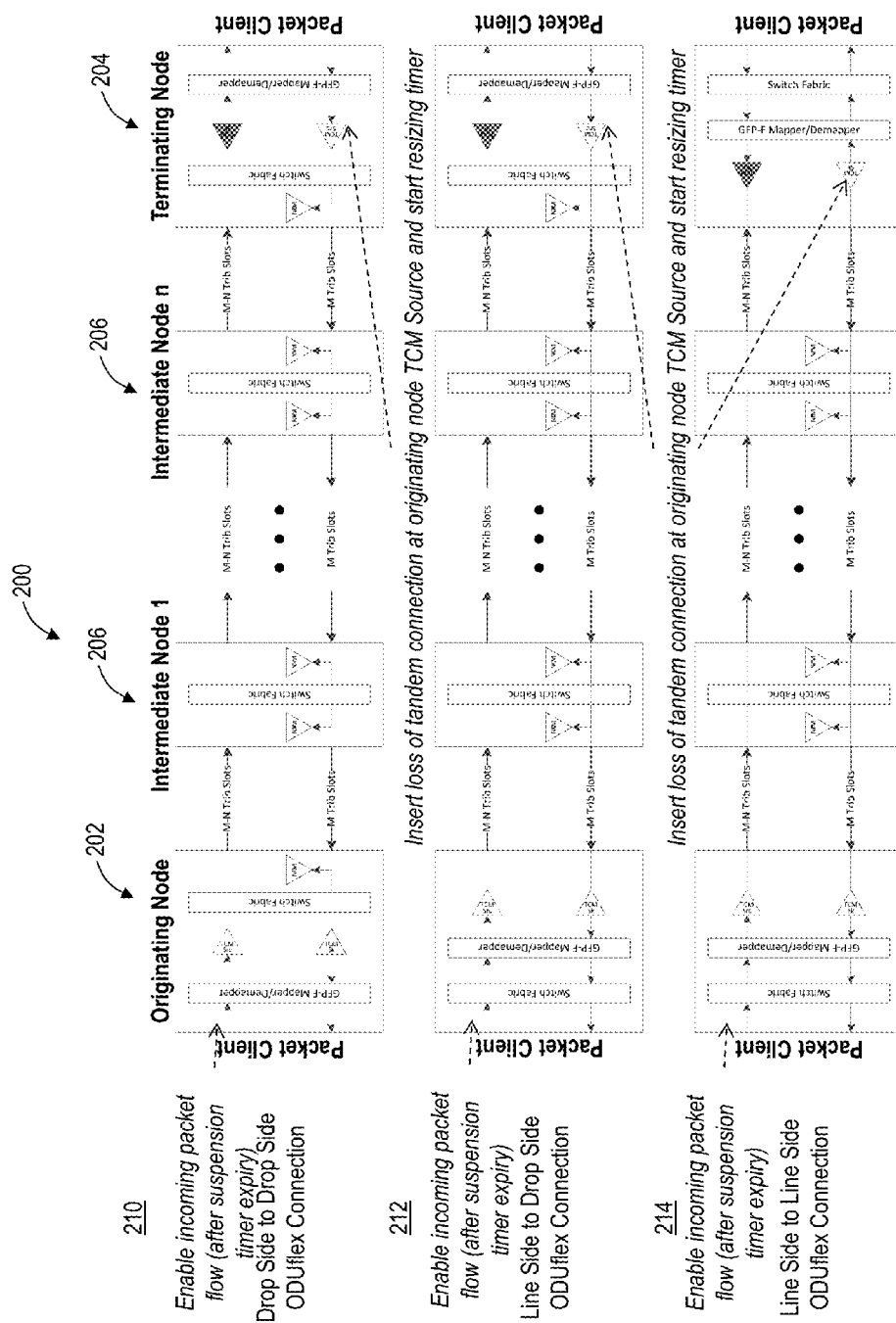

FIG. 27 illustrates the step 276 (Issue Path Resizing Trigger) in the resizing decrease operation 270. This includes issuing a path resizing trigger in the terminating to originating direction, setting the TCM source at terminating to transmit all-zeroes in TCM bytes associated with end-to-end connection monitor, or send control plane resizing trigger message along original path (M tributary slots), and starting a timer tuned to the worst case resizing reconfiguration time for any single node (at expiry of this timer all nodes should have completed their local resizing operations and transport of packet flows may be resumed). Also, packet transport can begin again at the originating node 202 and packet transport can be enabled at the originating node 202 (remove the insertion of only GFP-F Idle frames).

Figure 28:
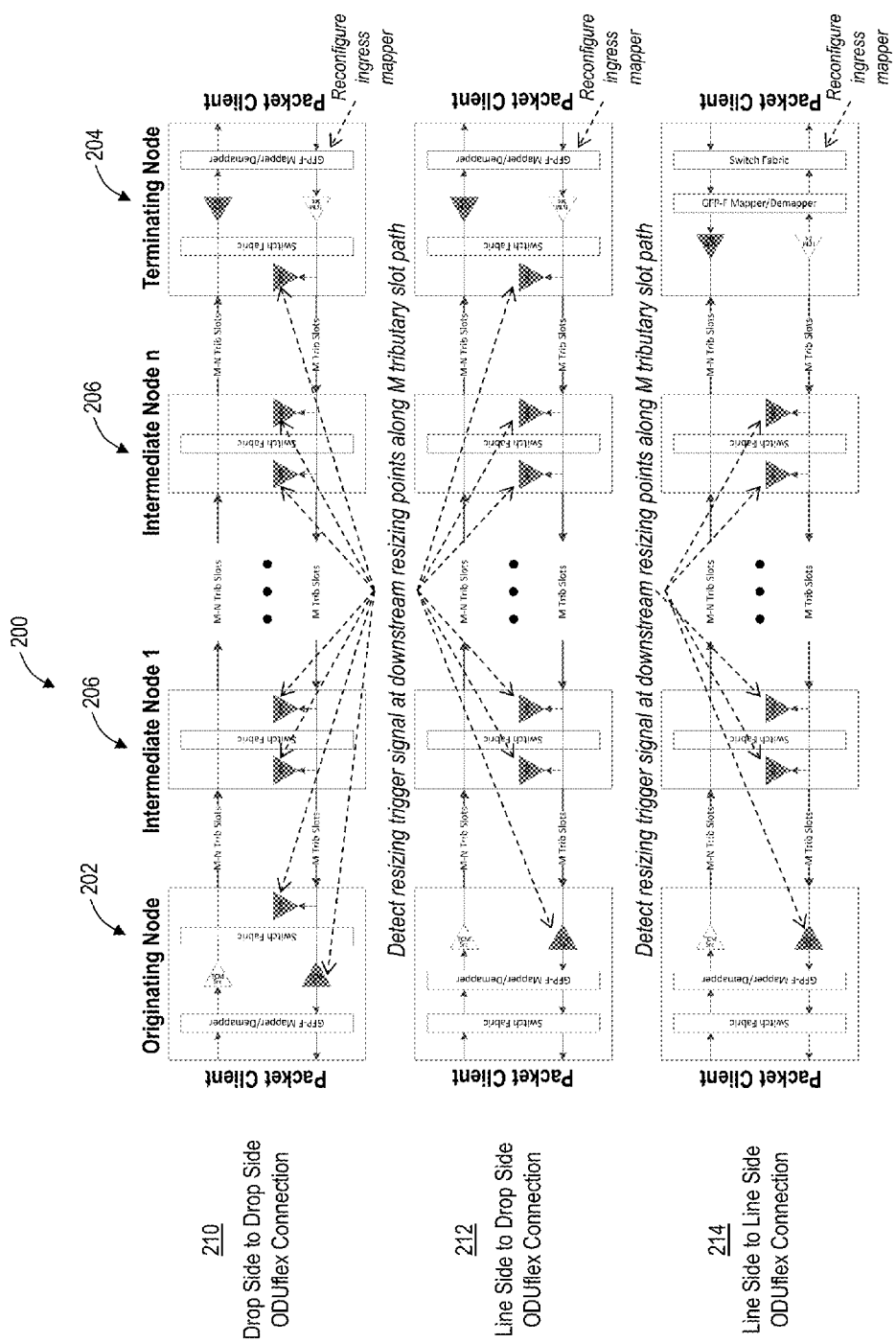

FIG. 28 illustrates the step 277 (Initiate Local Node Resizing Operations) in the resizing decrease operation 270. This includes reconfiguring the originating interface by reconfiguring the GFP-F mapper for M–N tributary slots operation, and detecting resizing trigger at all downstream interfaces through either control plane signaling message or in-band trigger may be used (Loss of Tandem Connection shown here provides ~3.5-300 us detection time depending on ODUflex rate). Again, the resizing operations at each node 202, 204, 206 occur in parallel.

Figure 29:
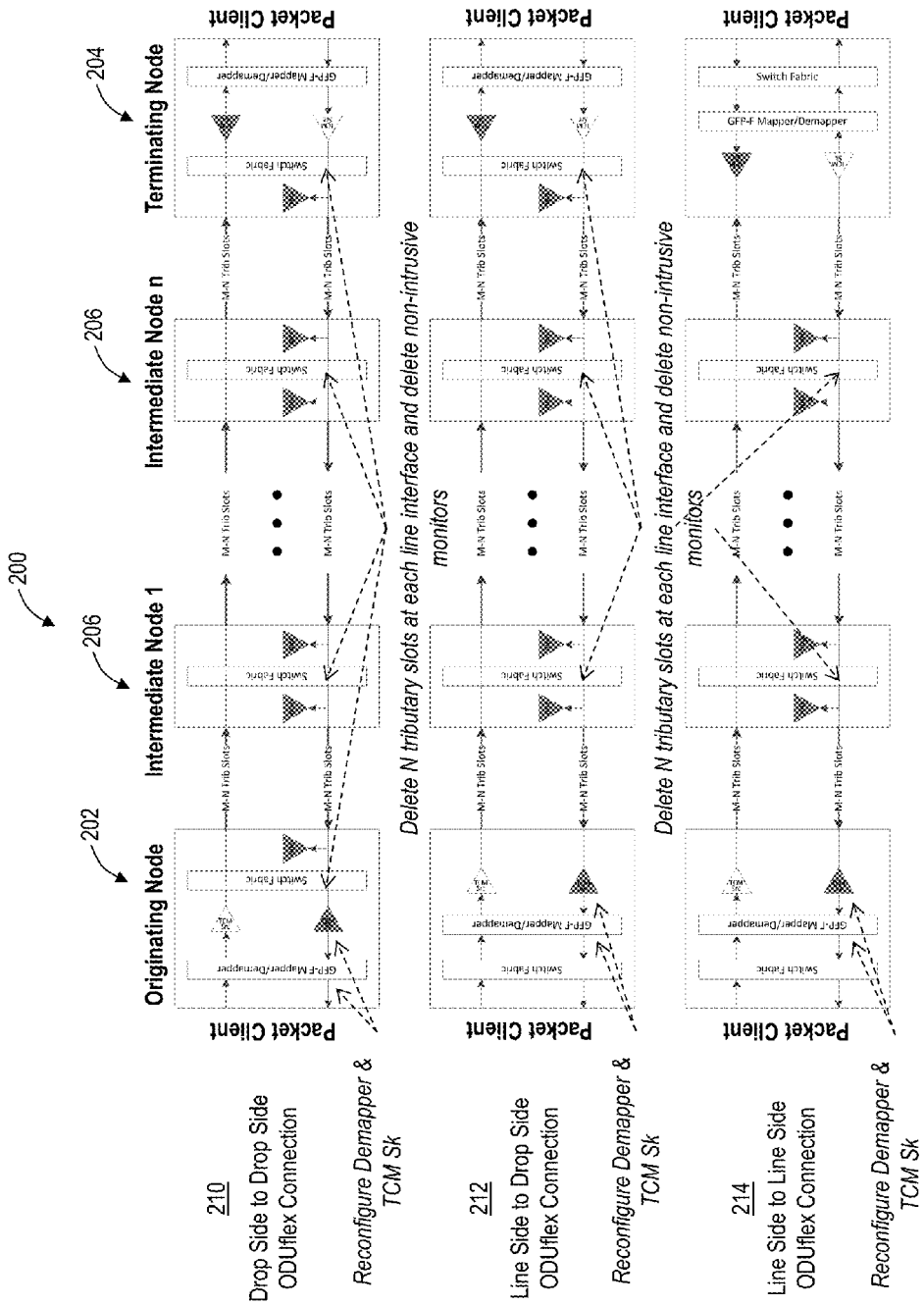

FIG. 29 illustrates the step 278 (Perform Path Resizing) in the resizing decrease operation 270. This includes locally resizing each line interface (see FIG. 26) and reconfiguring the originating interface by reconfiguring the TCM sink function (if it exists) and the GFP-F demapper for M–N tributary slots operation.

Figure 30:
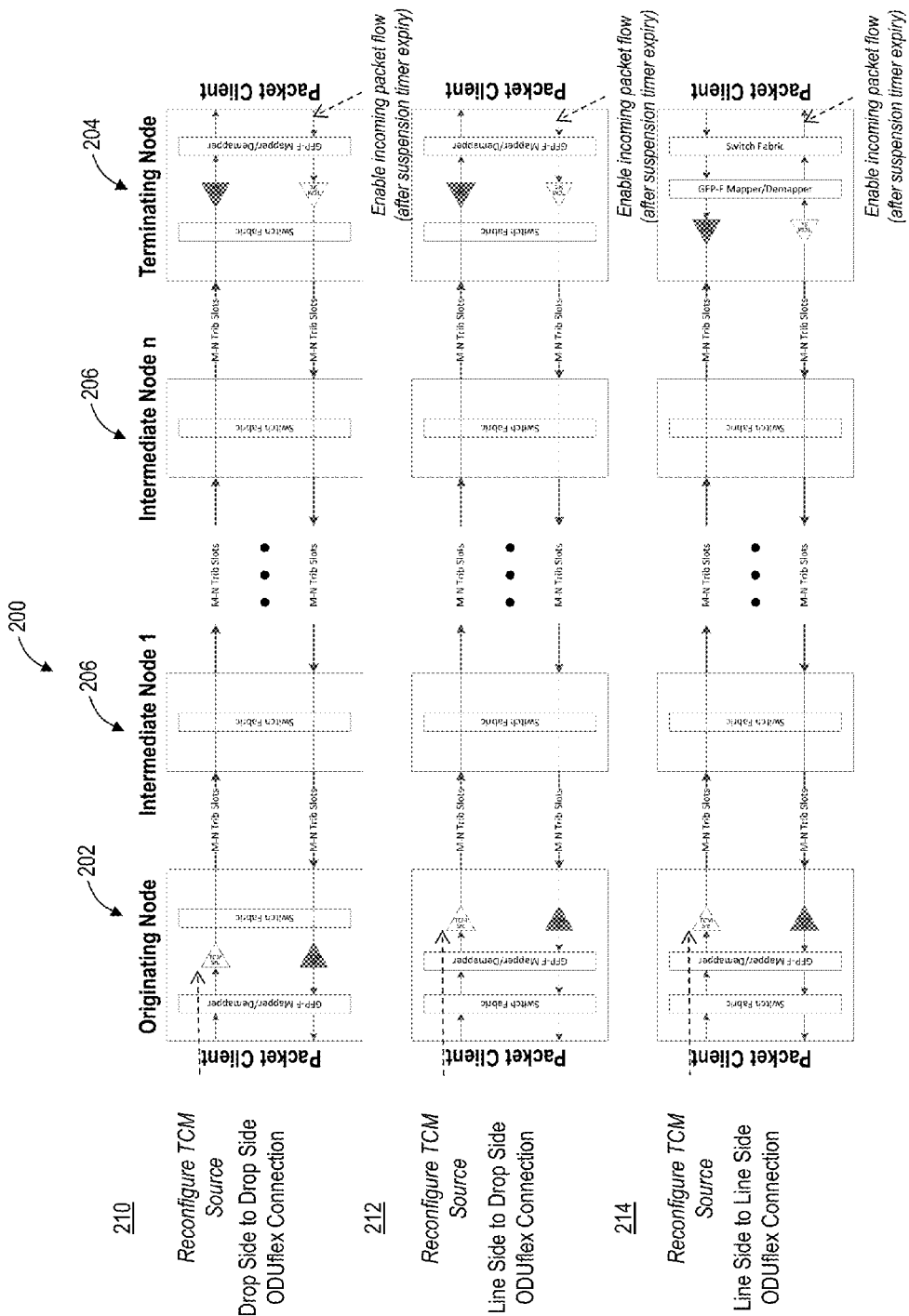
Figure 31:
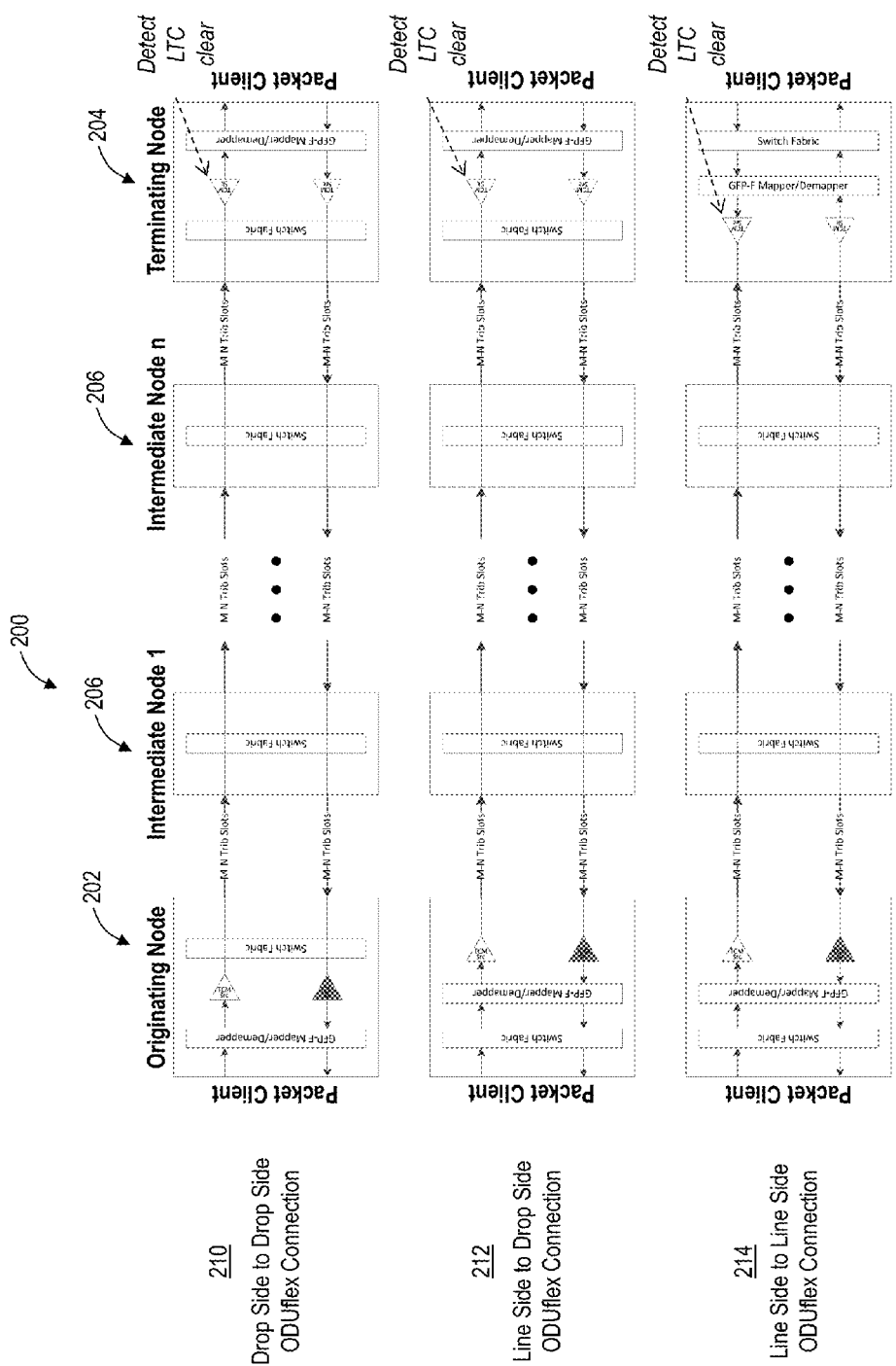
Figure 32:
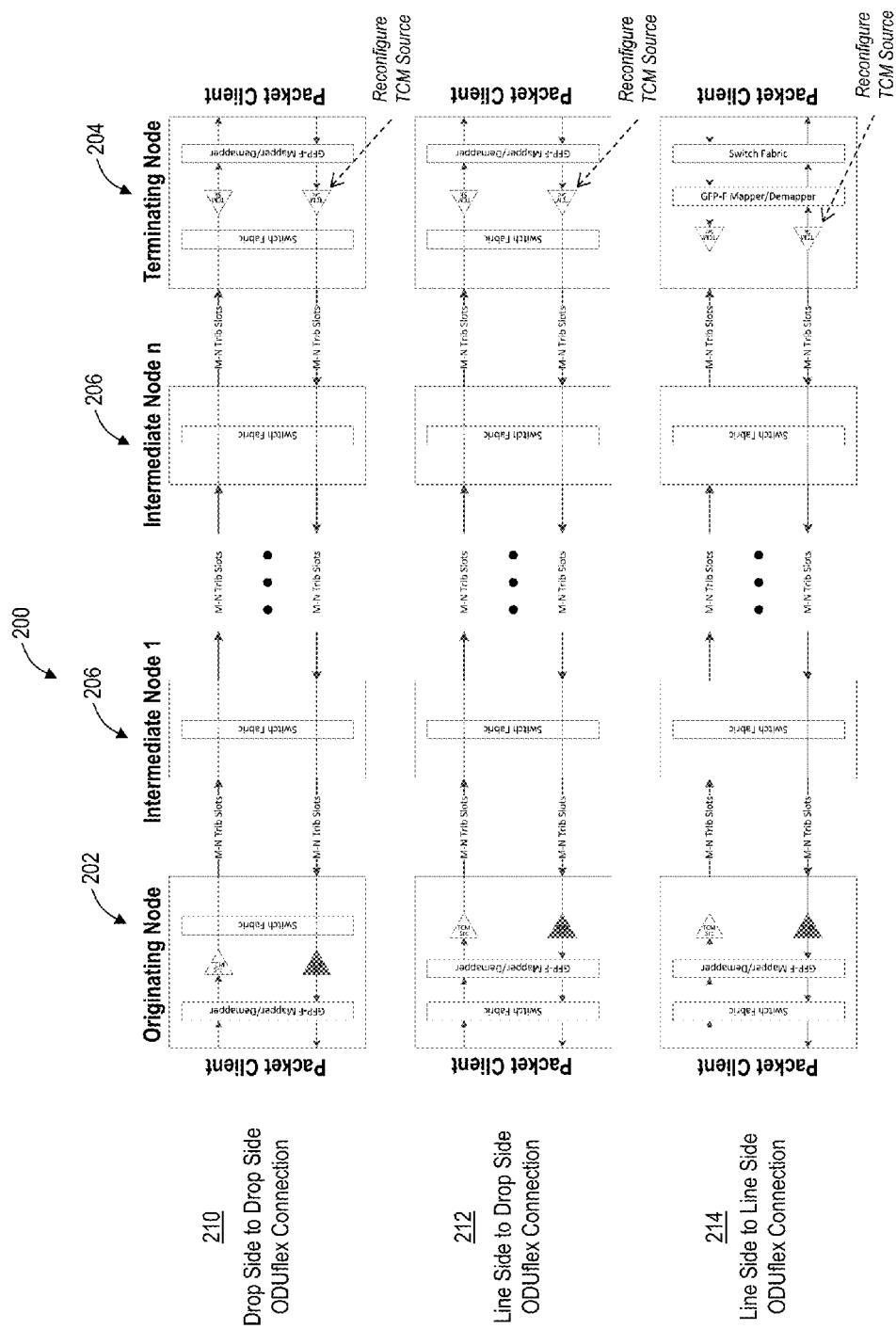
Figure 33:

FIGS. 30-33 illustrate the step 279 (Initiate Resizing Complete Acknowledgment) in the resizing decrease operation 270. In FIG. 30, a valid Tandem Connection (LTC) is inserted at the originating node 202, the TCM source is set at the originating node 202 to transmit valid TCM bytes associated with M–N tributary slot end-to-end connection monitor, packet transport begins at the terminating node 204 and packet transport is enabled at the terminating node 204 (remove the insertion of only GFP-F Idle frames). In FIG. 31, a valid Tandem Connection (LTC) is detected at the originating node 202 and clear of end-to-end loss of tandem connection is detected at the originating node 202. In FIG. 32, valid Tandem Connection (LTC) is inserted at the terminating node 204 and the TCM source at the terminating node 204 is set to transmit valid TCM bytes associated with M–N tributary slot end-to-end connection monitor. Finally, in FIG. 33, the valid Tandem Connection (LTC) is detected at the originating node 202 and clear of end-to-end loss of tandem connection is detected at the originating node 202.

New Connection with LAG

Figure 34:
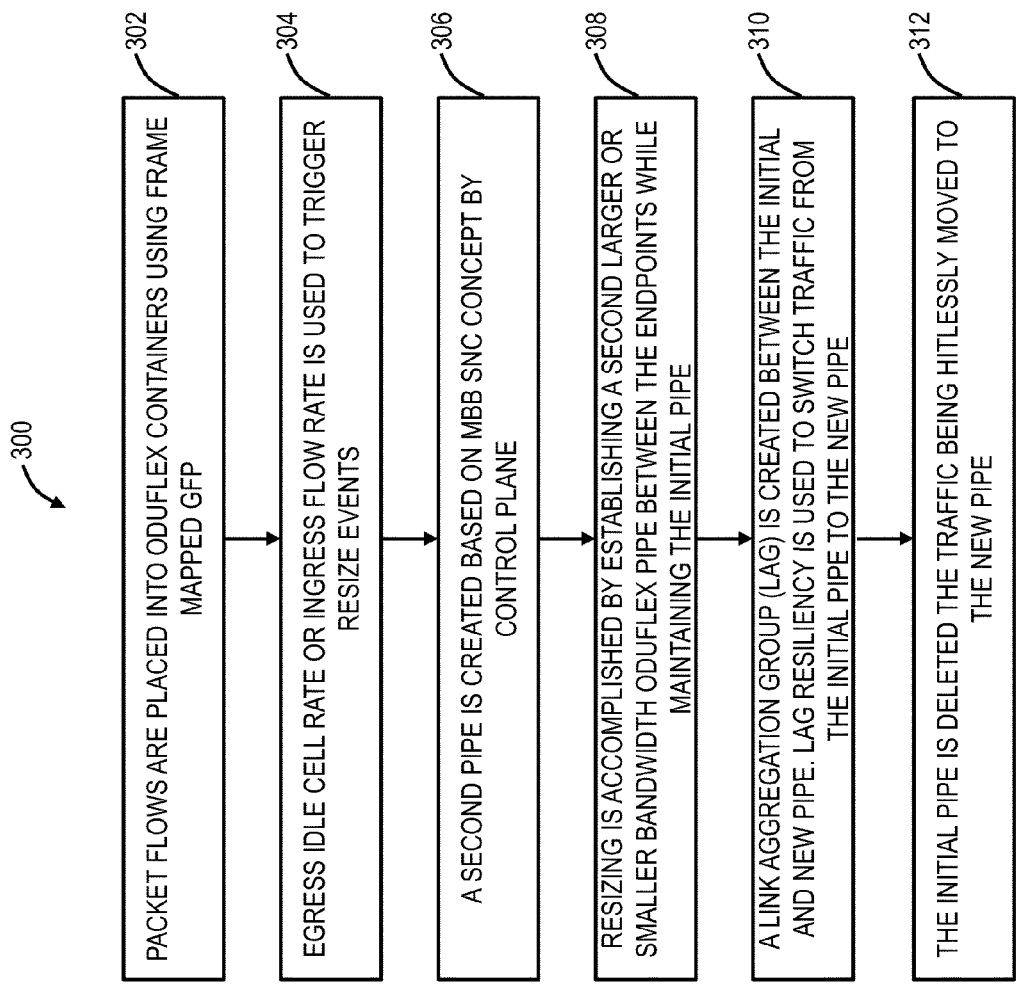
FIG. 34 is a flowchart illustrates an ODUflex resizing method using LAGs.

Referring to FIG. 34, in an exemplary embodiment, a flow chart illustrates an ODUflex resizing method 300 using LAGs. The ODUflex resizing method 300 includes packet terminating SNCs/LSPs used to provide transport between end packet switching sites. The packet flows are placed into ODUflex containers using frame mapped GFP (step 302). Egress idle cell rate or ingress flow rate is used to trigger resize events (step 304). A second pipe is created based on an MBB SNC concept by the control plane 140 (step 306). This new connection may or may not completely/partially overlap with the existing path. Resizing is accomplished by establishing a second, larger or smaller bandwidth ODUflex pipe between the endpoints while maintaining the initial pipe (step 308). A Link Aggregation Group (LAG) is created between the initial and new pipe; LAG resiliency is used to switch traffic from the initial pipe to the new pipe (step 310). Finally the initial pipe is deleted the traffic being hitlessly moved to the new pipe (step 312). The ODUflex resizing method 300 combines link aggregation groups from packet technology with Make Before Break SNC technology and from OTN control plane technology to create a simpler hitless resizing solution (than G.7044 HAO).

Figure 35:
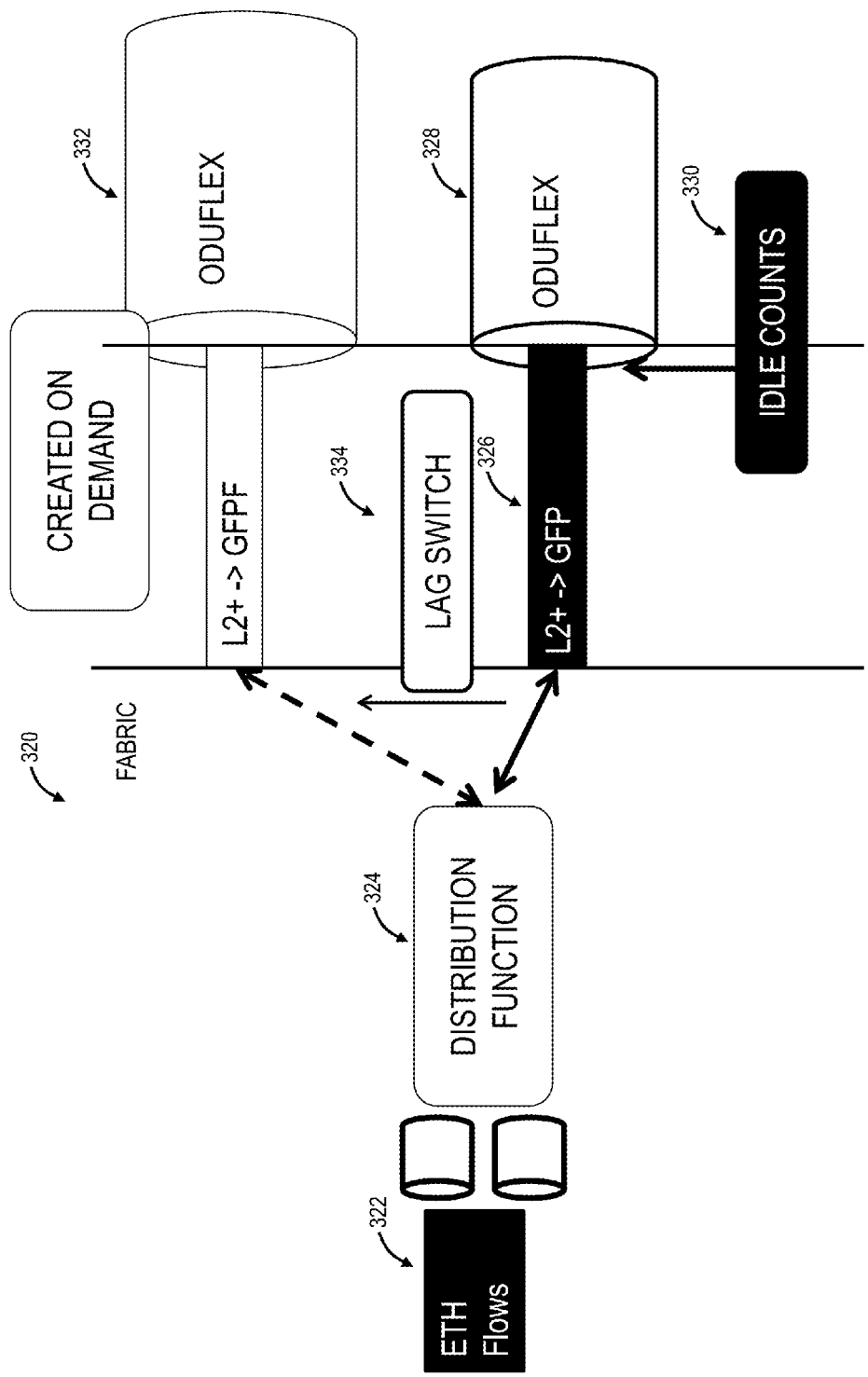
FIG. 35 is a block diagram of functionality at a node.

Referring to FIG. 35, in an exemplary embodiment, a block diagram illustrates functionality at a node 320. The nodes have Ethernet flows 322 that are provided to Layer 1 via a distribution function 324 which maps the Ethernet flows 322 via GFP 326 to an ODUflex 328. The node 320 may monitor idle counts 330 on the Ethernet flows 322 for purposes of detecting a need to resize. With the ODUflex resizing method 300, a second ODUflex 332 is created—either larger or smaller than the ODUflex 328—and on the same or different links as well. Once created, the ODUflex's 328, 332 are configured in a LAG, and a LAG switch 334 is performed to hitlessly switch to the ODUflex 332 for resizing. Subsequently, the ODUflex 328 can be recovered.

Figure 36:
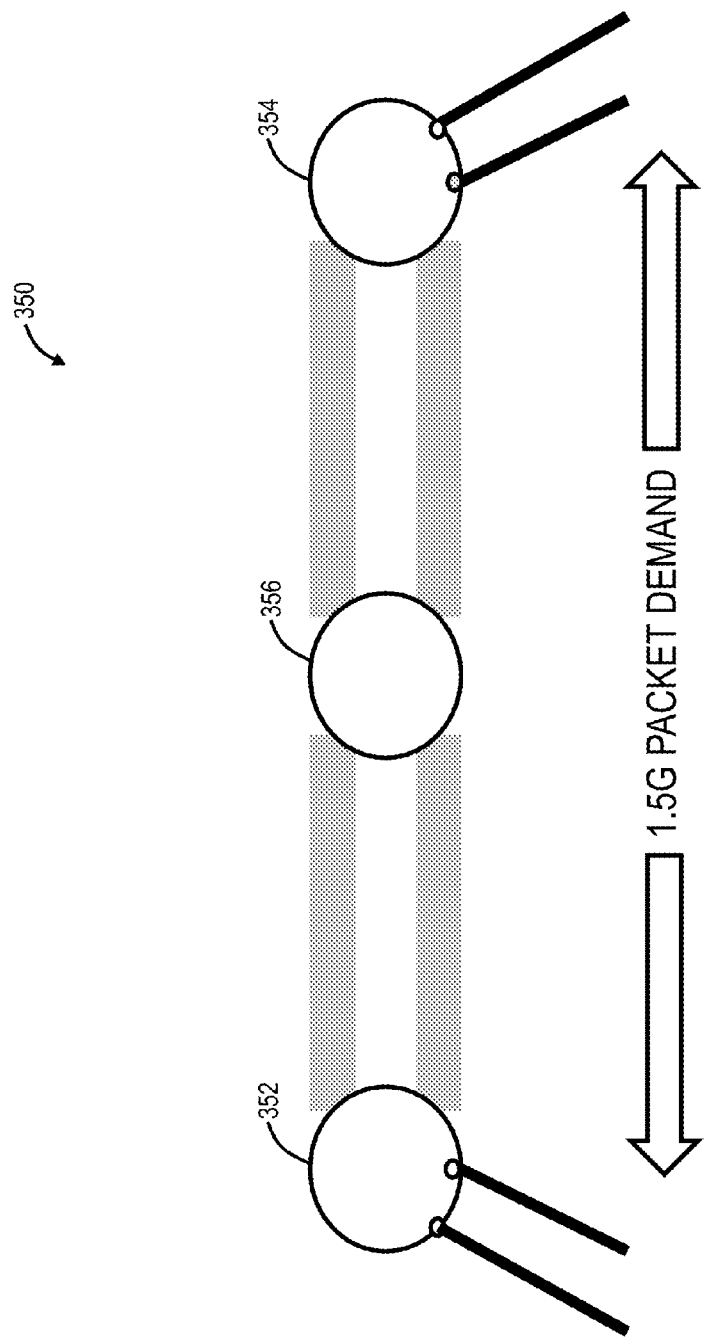
FIGS. 36-42 are network diagrams of an exemplary network and an associated operation of the ODUflex resizing method of FIG. 35 thereon.
Figure 37:
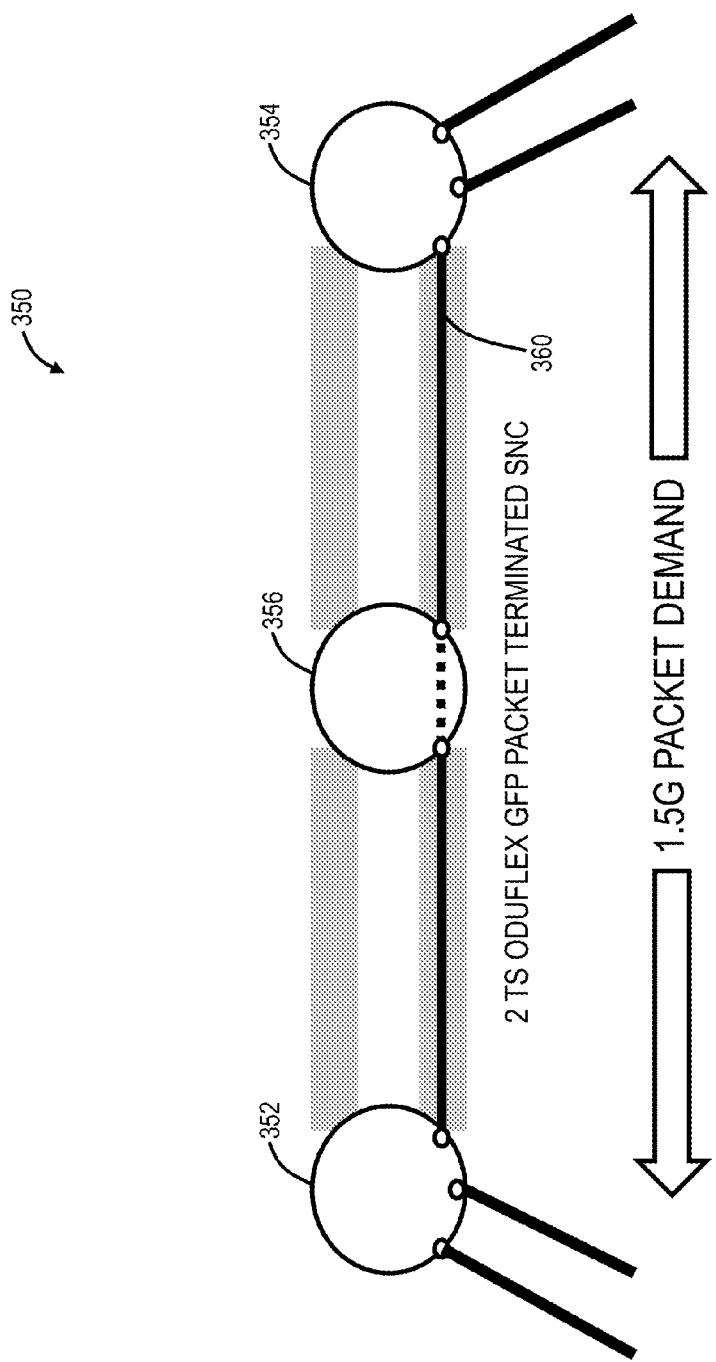
Figure 38:
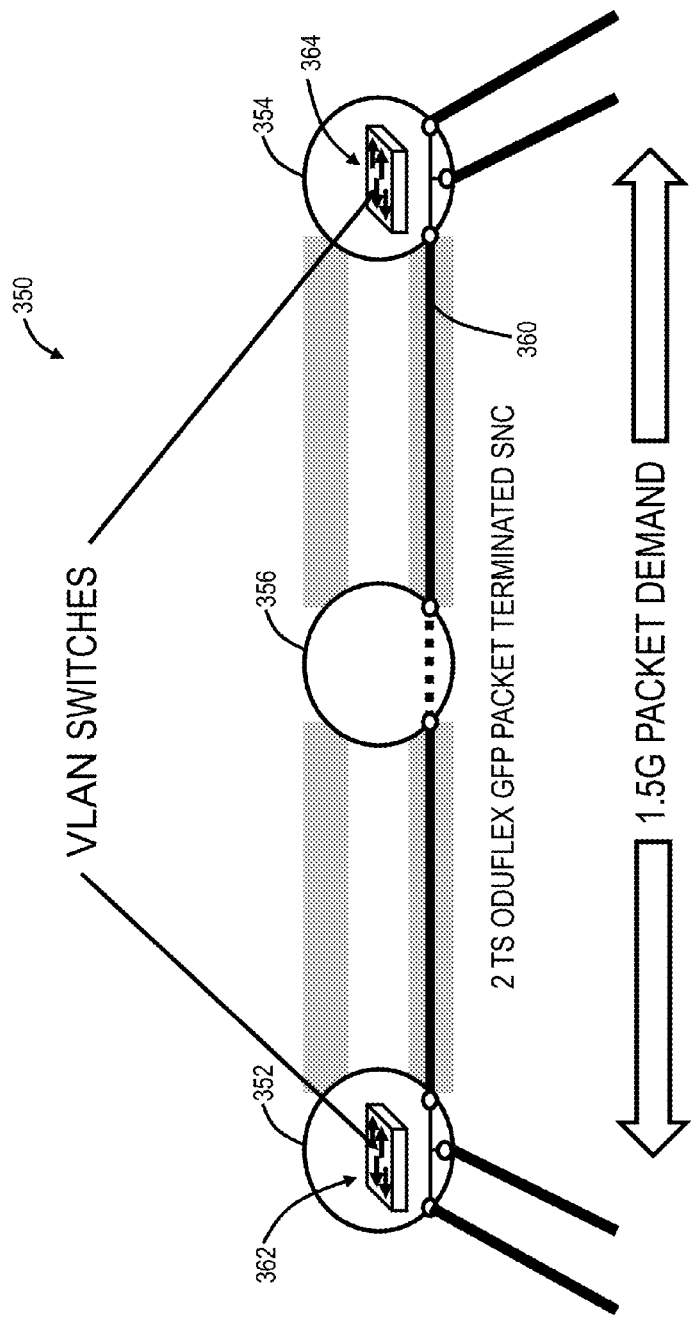

Referring to FIGS. 36-42, in various exemplary embodiments, network diagrams illustrate an exemplary network 350 and an associated operation of the ODUflex resizing method 300 thereon. In FIG. 36, the network 350 includes three nodes 352, 354, 356 with, for example, 1.5 G of packet demand between the nodes 352, 354 with the nodes 356 in-between. In FIG. 37, a 2 Timeslot (TS) ODUflex GFP packet terminated SNC 360 is formed between the nodes 352, 354 and through the node 356. FIG. 38 illustrates VLAN switches 362, 364 at the nodes 352, 354 for switching between ports.

Figure 39:
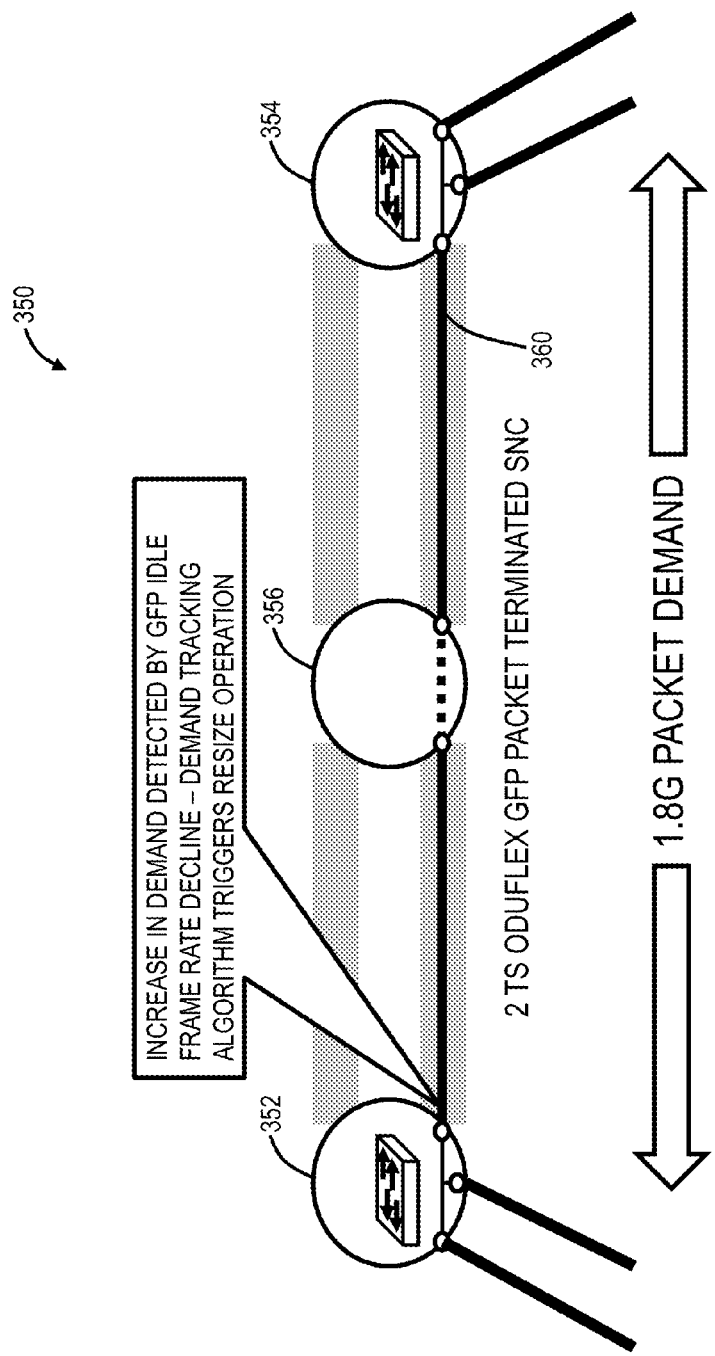
Figure 40:
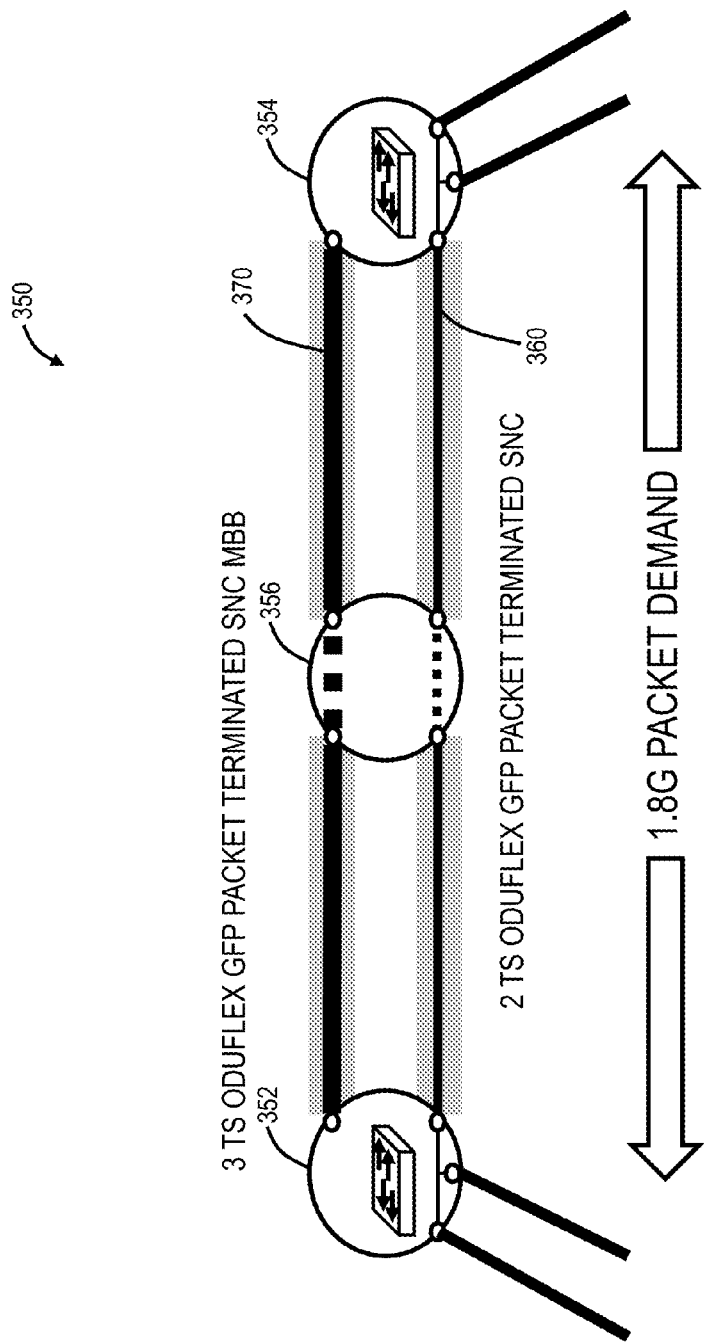
Figure 41:
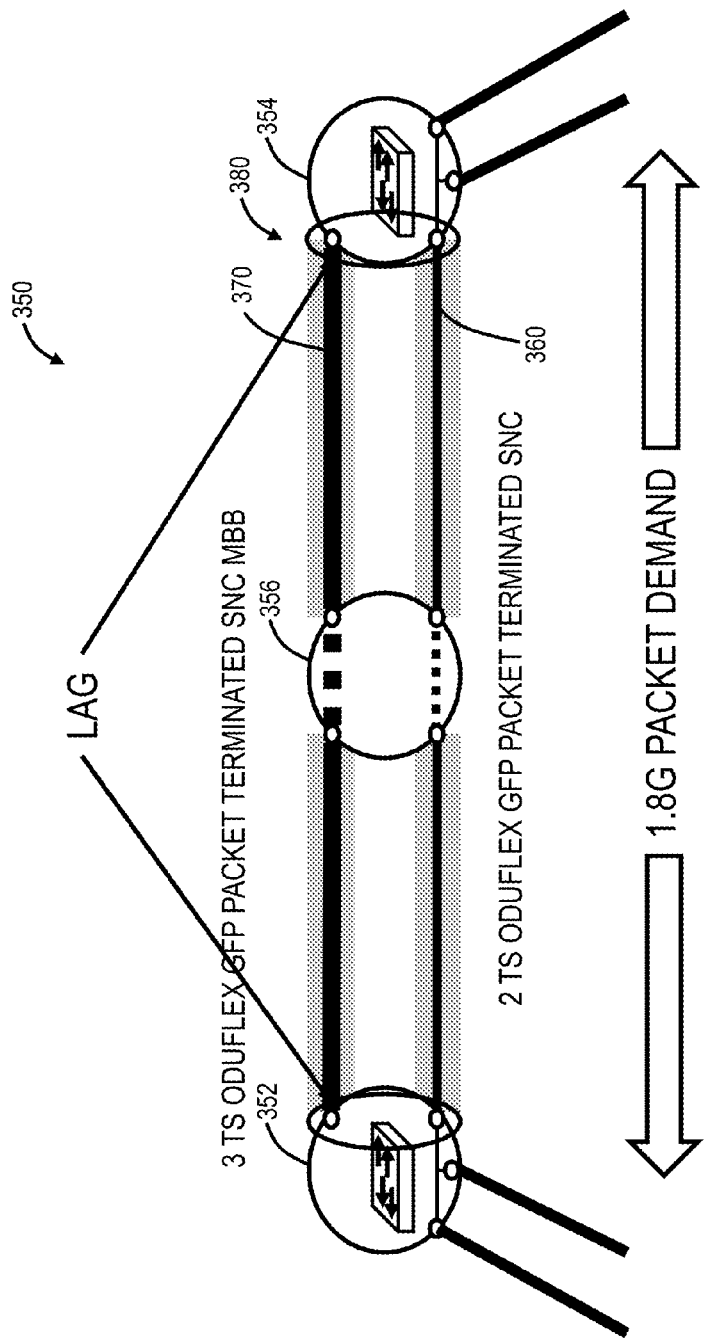
Figure 42:
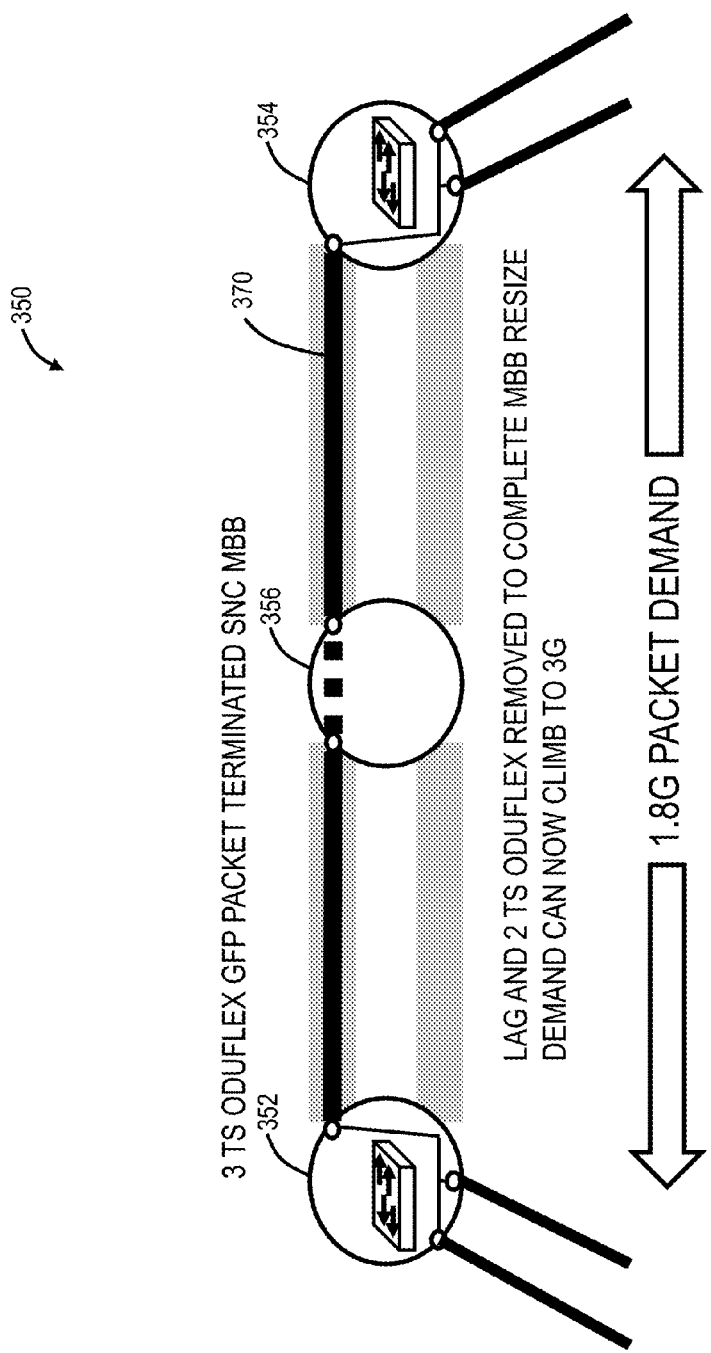

In FIG. 39, the node 352 detects an increase in demand by a GFP idle frame rate decline and a demand tracking algorithm triggers resize operation. It is determined whether or not the path between the nodes 352, 354 support the increase. In this example, it is determined that this same path can support 3 new TSs (if not, a new path would be determined). In FIG. 40, a new SNC 370 is created using MBB with 3 TSs to support 1.8 G of packet demand. In FIG. 41, the SNCs 360, 370 are configured in a LAG 380. Finally, in FIG. 42, via LAG switching, the Ethernet flows are switched, hitlessly to the SNC 370, and the SNC 360 is recovered, Exemplary Network Element/Node Referring to FIG. 43, in an exemplary embodiment, a block diagram illustrates an exemplary node 400 for use with the systems and methods described herein. In an exemplary embodiment, the exemplary node 400 can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM) platform, etc. into a single, high-capacity intelligent switching system providing Layer 0, 1, and/or 2 consolidation. In another exemplary embodiment, the node 400 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 400 can be any digital system with ingress and egress digital signals and switching therebetween of channels, timeslots, tributary units, etc. While the node 400 is generally shown as an optical network element, the systems and methods contemplated for use with any switching fabric, network element, or network based thereon.

In an exemplary embodiment, the node 400 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460 (as well as a Path Computation Element (PCE), Software Defined Network (SDN) controller, OpenFlow controller, etc.). The management system 450 can include a network management system (NMS), element management system (EMS), or the like. Additionally, the common equipment 410 can include a control plane processor, such as a controller 500 illustrated in FIG. 44, configured to operate the control plane as described herein. The node 400 can include an interface 470 for communicatively coupling the common equipment 410, the line modules 420, and the switch modules 430 therebetween. For example, the interface 470 can be a backplane, mid-plane, a bus, optical or electrical connectors, or the like. The line modules 420 are configured to provide ingress and egress to the switch modules 430 and to external connections on the links to/from the node 400. In an exemplary embodiment, the line modules 420 can form ingress and egress switches with the switch modules 430 as center stage switches for a three-stage switch, e.g. a three stage Clos switch. Other configurations and/or architectures are also contemplated. The line modules 420 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 420 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 420 can include wavelength division multiplexing interfaces, short reach interfaces, and the like, and can connect to other line modules 420 on remote network elements, end clients, edge routers, and the like, e.g. forming connections on the links in the network 100. From a logical perspective, the line modules 420 provide ingress and egress ports to the node 400, and each line module 420 can include one or more physical ports. The switch modules 430 are configured to switch channels, timeslots, tributary units, packets, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 430 can include Time Division Multiplexed (TDM) (i.e., circuit switching) and/or packet switching engines. The switch modules 430 can include redundancy as well, such as 1:1, 1:N, etc. In an exemplary embodiment, the switch modules 430 provide OTN switching and/or Ethernet switching.

Those of ordinary skill in the art will recognize the node 400 can include other components which are omitted for illustration purposes, and that the systems and methods described herein are contemplated for use with a plurality of different network elements with the node 400 presented as an exemplary type of network element. For example, in another exemplary embodiment, the node 400 may not include the switch modules 430, but rather have the corresponding functionality in the line modules 420 (or some equivalent) in a distributed fashion. For the node 400, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 400 is merely presented as one exemplary node 400 for the systems and methods described herein.

Exemplary Controller

Figure 44:
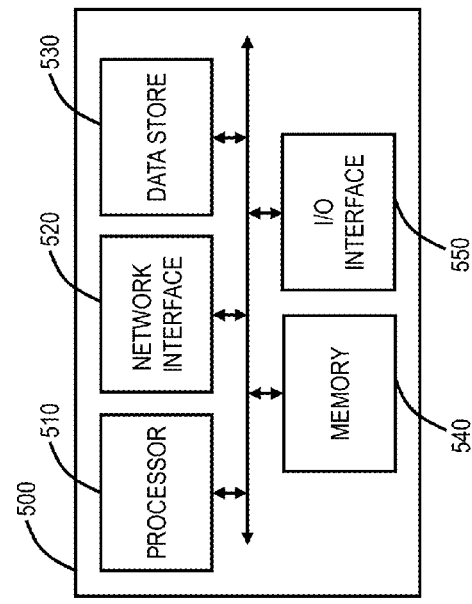
FIG. 44 is a block diagram of a controller to provide control plane processing and/or operations, administration, maintenance, and provisioning (OAM&P) for the node of FIG. 43.

Referring to FIG. 44, in an exemplary embodiment, a block diagram illustrates a controller 500 to provide control plane processing and/or operations, administration, maintenance, and provisioning (OAM&P) for the node 400. The controller 500 can be part of common equipment, such as common equipment 410 in the node 400, or a stand-alone device communicatively coupled to the node 400 via the DCN 460. The controller 500 can include a processor 510 which is hardware device for executing software instructions such as operating the control plane. The processor 510 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 510 is configured to execute software stored within memory, to communicate data to and from the memory, and to generally control operations of the controller 500 pursuant to the software instructions. The controller 500 can also include a network interface 520, a data store 530, memory 540, an I/O interface 550, and the like, all of which are communicatively coupled therebetween and with the processor 510.

The network interface 520 can be used to enable the controller 500 to communicate on the DCN 460, such as to communicate control plane information to other controllers, to the management system 450, and the like. The network interface 520 can include, for example, an Ethernet card (e.g., 10BaseT, Fast Ethernet, Gigabit Ethernet) or a wireless local area network (WLAN) card (e.g., 802.11). The network interface 520 can include address, control, and/or data connections to enable appropriate communications on the network. The data store 530 can be used to store data, such as control plane information, provisioning data, OAM&P data, etc. The data store 530 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 530 can incorporate electronic, magnetic, optical, and/or other types of storage media. The memory 540 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 540 may incorporate electronic, magnetic, optical, and/or other types of storage media. Note that the memory 540 can have a distributed architecture, where various components are situated remotely from one another, but may be accessed by the processor 510. The I/O interface 550 includes components for the controller 500 to communicate to other devices. Further, the I/O interface 550 includes components for the controller 500 to communicate with the other nodes, such as using overhead associated with OTN signals.

In an exemplary embodiment, the controller 500 is configured to communicate with other controllers 500 in the network 100 to operate the control plane for control plane signaling. This communication may be either in-band or out-of-band. For SONET networks and similarly for SDH networks, the controllers 500 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 500 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 500 is configured to operate the control plane 140 in the network 100. That is, the controller 500 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 500 can include a topology database that maintains the current topology of the network 100 based on control plane signaling (e.g., HELLO messages) and a connection database that maintains available bandwidth on the links 120 again based on the control plane signaling. Again, the control plane is a distributed control plane; thus a plurality of the controllers 500 can act together to operate the control plane using the control plane signaling to maintain database synchronization. In source-based routing, the controller 500 at a source node for a connection is responsible for path computation and establishing by signaling other controllers 500 in the network 100. For example, the source node and its controller 500 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes from the originating node to the destination node based on a plurality of constraints such as administrative weights on the links, bandwidth availability on the links, etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Optical channel Data Unit flex (ODUflex) resizing method, in a node in a network, comprising:
   determining, based on monitoring an egress cell rate or an ingress flow rate, that the ODUflex requires resizing to support the egress cell rate or the ingress flow rate, wherein the ODUflex is configured in the network on a current path between the node and a second node in the network;

when the resizing is a decrease, reducing a size of the ODUflex by one of i) a resize decrease operation using a control plane and ii) a Link Aggregation Group (LAG) and Make-Before-Break (MBB) operation; and when the resizing is an increase, increasing a size of the ODUflex by one of i) a resize increase operation using a control plane and ii) a LAG and MBB operation, wherein the resizing is done in a hitless manner and without using state machines and rate ramping of ITU Recommendation G.7044/Y.1347 (10/11) via one of i) the control plane signaling to partially configure or reserve a resized path, suspending transfer of packets across the ODUflex just prior to physical resizing when buffering is available, and signaling to the partially configured or reserved resized path, and ii) in the LAG, creating a new member while maintaining an initial member, performing the MBB operation between the new member and the initial member, and deleting the initial member.

2. The ODUflex resizing method of claim 1, wherein the increasing comprises:
determining that one or more links in the current path are unable to support the increase, and
performing the increase on a new path.

3. The ODUflex resizing method of claim 1, wherein each of the resize increase operation using the control plane and the resize decrease operation using the control plane comprises:
suspending transport of incoming packet flows,
issuing a path resize trigger,
initiating local node resizing operations,
performing path resizing, and
enabling the incoming packet flows.

4. The ODUflex resizing method of claim 3, wherein the local node resizing operations are performed substantially in parallel with nodes in the network.

5. The ODUflex resizing method of claim 3, further comprising suspending the transport of incoming packet flows using flow control mechanisms with Pause frames or switch flow control (Xon/Xoff) toward a packet client.

6. The ODUflex resizing method of claim 1, wherein the ODUflex is an ODUflex (Generic Framing Procedure).

7. A node, in a network, comprising:
a plurality of ports configured with switching between one another; and
a controller configured to
determine, based on monitoring egress idle cell rate or ingress flow rate, that an Optical channel Data Unit flex (ODUflex) requires resizing to support the egress cell rate or the ingress flow rate on a port of the plurality of ports, wherein the ODUflex is configured in the network on a current path between the node and a second node in the network,
when the resizing is a decrease, cause a reduction in a size of the ODUflex by one of i) a resize decrease operation using a control plane and ii) a Link Aggregation Group and Make-Before-Break operation, and
when the resizing is an increase, cause an increase in a size of the ODUflex by one of i) a resize increase operation using a control plane and ii) a Link Aggregation Group and Make-Before-Break operation, wherein the resizing is done in a hitless manner and without using state machines and rate ramping of ITU Recommendation G.7044/Y.1347 (10/11) via one of i) the control plane signaling to partially configure or reserve a resized path, suspension transfer of packets across the ODUflex just prior to physical resizing when buffering is available, and signaling to the partially configured or reserved resized path, and ii) in the LAG, creation of a new member while maintaining an initial member, performance of the MBB operation between the new member and the initial member, and deletion of the initial member.

8. The node of claim 7, wherein the ODUflex is an ODUflex (Generic Framing Procedure).

9. The node of claim 7, wherein the resize increase operation using the control plane or the resize decrease operation using the control plane includes the controller:
suspending transport of incoming packet flows,
issuing a path resize trigger,
initiating local node resizing operations,
performing path resizing, and
enabling the incoming packet flows.

10. The node of claim 9, wherein the controller is configured to cause suspension of incoming packet flows using flow control mechanisms with Pause frames or switch flow control (Xon/Xoff) toward a packet client.

11. A network, comprising:
an originating node;
a terminating node communicatively coupled to the originating node, wherein an Optical channel Data Unit flex (ODUflex) is configured between the originating node and the terminating node; and
at least one intermediate node between the originating node and the terminating node; and wherein at least one of the originating node and the terminating node is configured to
determine, based on monitoring egress idle cell rate or ingress flow rate, the ODUflex requires resizing on a port of the plurality of ports to support the egress cell rate or the ingress flow rate,
when the resizing is a decrease, cause a reduction in a size of the ODUflex by one of i) a resize decrease operation using a control plane and ii) a Link Aggregation Group and Make-Before-Break operation, and
when the resizing is an increase, cause an increase a size of the ODUflex by one of i) a resize increase operation using a control plane and ii) a Link Aggregation Group and Make-Before-Break operation,
wherein the resizing is done in a hitless manner and without using state machines and rate ramping of ITU Recommendation G.7044/Y.1347 (10/11) via one of
i) the control plane signaling to partially configure or reserve a resized path, suspension transfer of packets across the ODUflex just prior to physical resizing when buffering is available, and signaling to the partially configured or reserved resized path, and
ii) in the LAG, creation of a new member while maintaining an initial member, performance of the MBB operation between the new member and the initial member, and deletion of the initial member.

* * * * *